Figure 1:
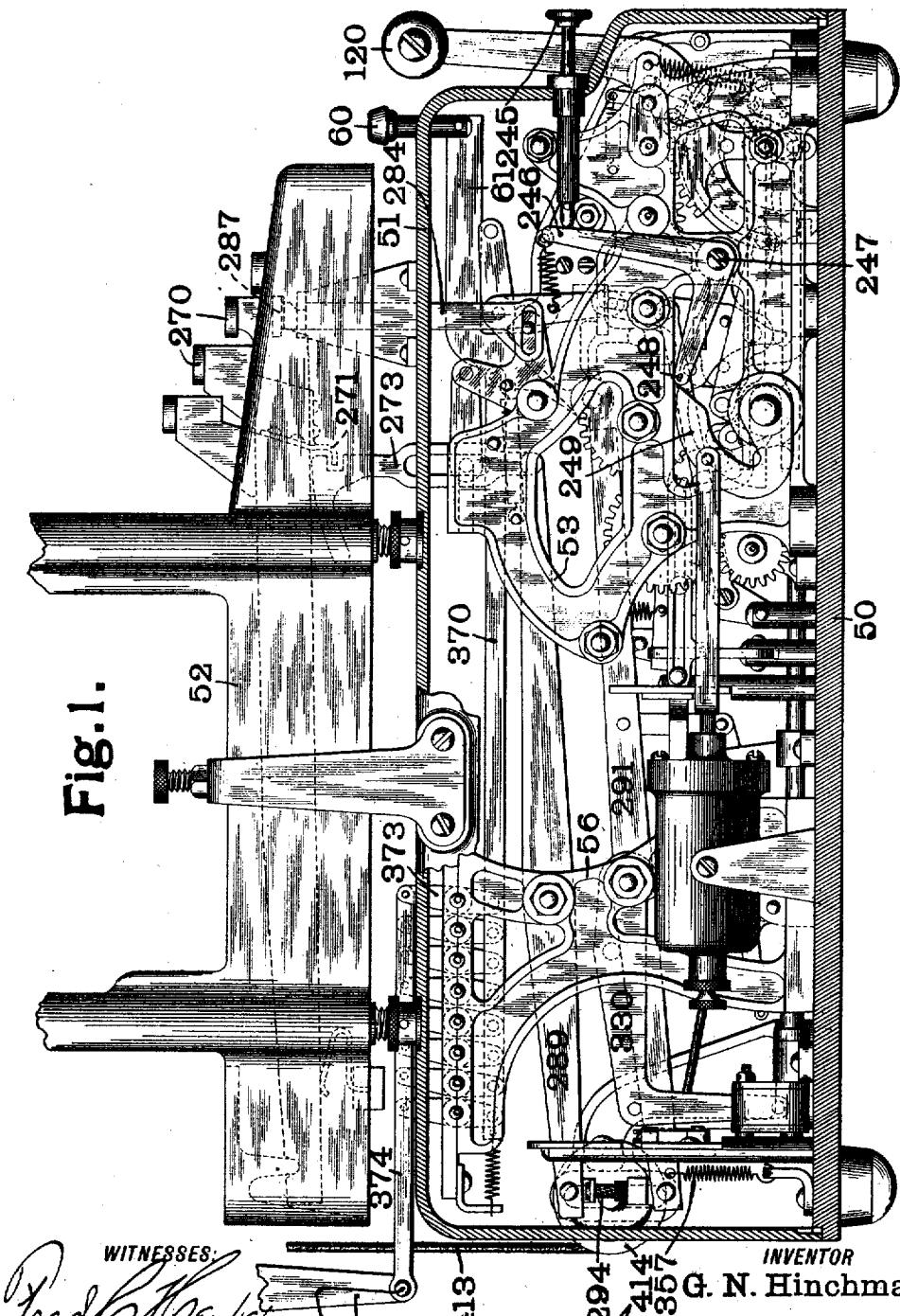

G. N. HINCHMAN.
ADDING MACHINE.
APPLICATION FILED JULY 25, 1906.

916,445.

Patented Mar. 30, 1909.
27 SHEETS—SHEET 1.

WITNESSES:
Fred C. Hauke.
W. A. Alexander.

INVENTOR
G. N. Hinchman.
BY
Fowler & Bryson
ATTORNEYS

THE NORRIS PETERS CO., WASHINGTON, D. C.

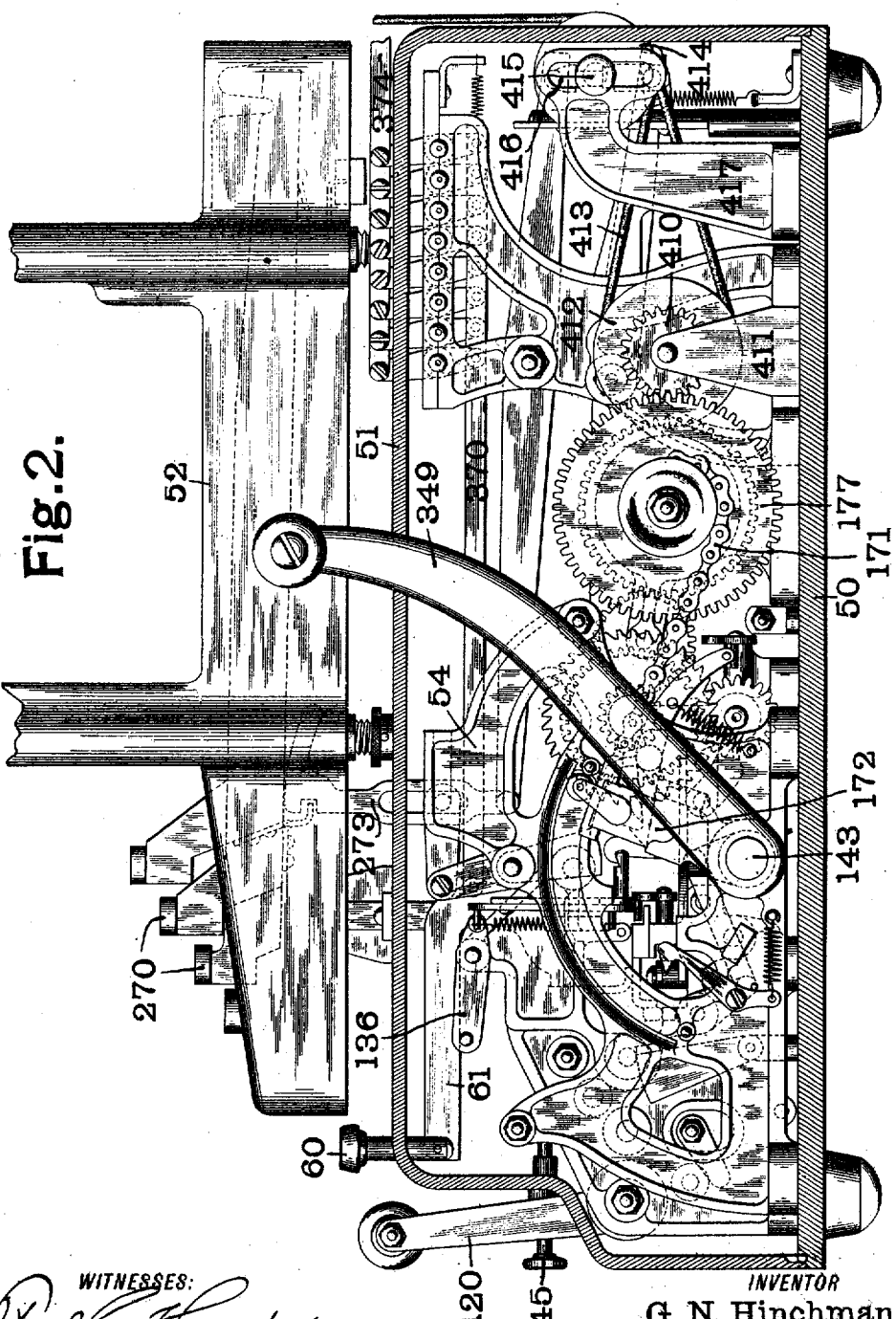

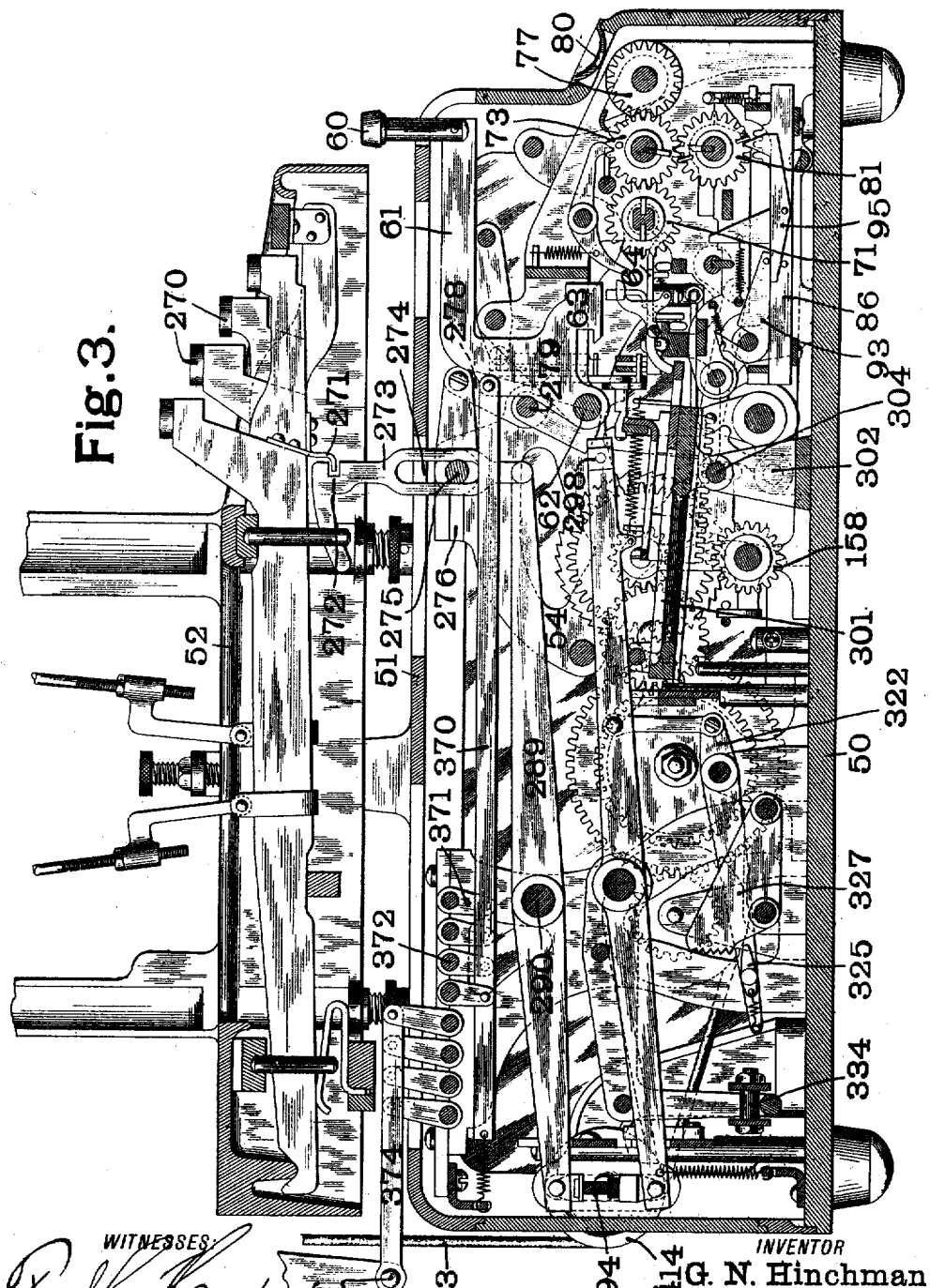

G. N. HINCHMAN.
ADDING MACHINE.
APPLICATION FILED JULY 25, 1906.
916,445.
Patented Mar. 30, 1909.
27 SHEETS—SHEET 4.
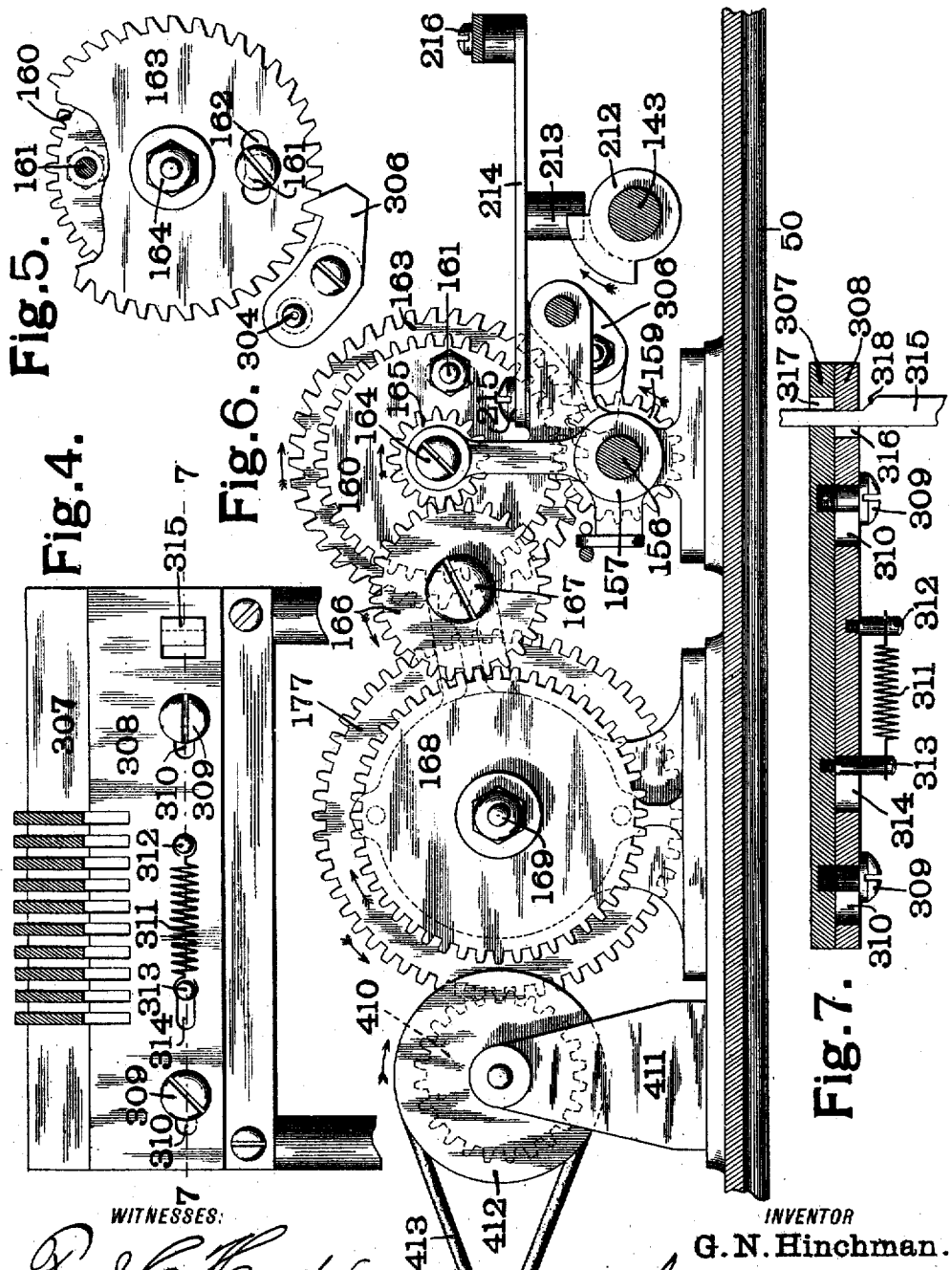
WITNESSES:
Fred C. Henkel
W. A. Alexander
INVENTOR
G. N. Hinchman.
BY
Fowler & Bryson
ATTORNEYS

G. N. HINCHMAN.
ADDING MACHINE.
APPLICATION FILED JULY 25, 1906.

916,445.

Patented Mar. 30, 1909.
27 SHEETS—SHEET 5.

WITNESSES:

INVENTOR
G. N. Hinchman.
BY
ATTORNEYS.

G. N. HINCHMAN.
ADDING MACHINE.
APPLICATION FILED JULY 25, 1906.

916,445.

Patented Mar. 30, 1909.
27 SHEETS—SHEET 6.

WITNESSES:
Fred C. Heuckel
W. H. Alexander.

INVENTOR
G. N. Hinchman.
BY
ATTORNEYS.

G. N. HINCHMAN.
ADDING MACHINE.
APPLICATION FILED JULY 25, 1906.

916,445.

Patented Mar. 30, 1909.
27 SHEETS—SHEET 8.

WITNESSES:
Fred C. Keukel
W. A. Alexander

INVENTOR
G. N. Hinchman.
BY
Fowler & Bryson
ATTORNEYS.

G. N. HINCHMAN.
ADDING MACHINE.
APPLICATION FILED JULY 25, 1906.
No. 916,445.
Patented Mar. 30, 1909.
27 SHEETS—SHEET 9.
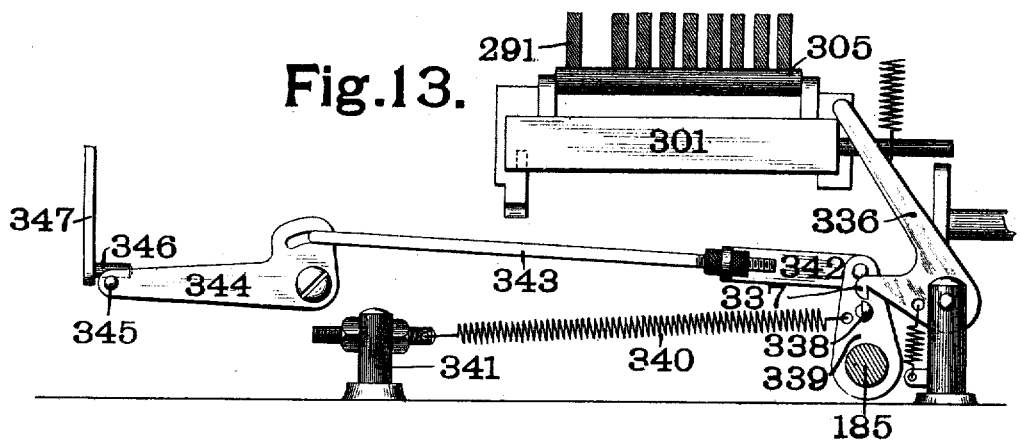
Fig. 13.
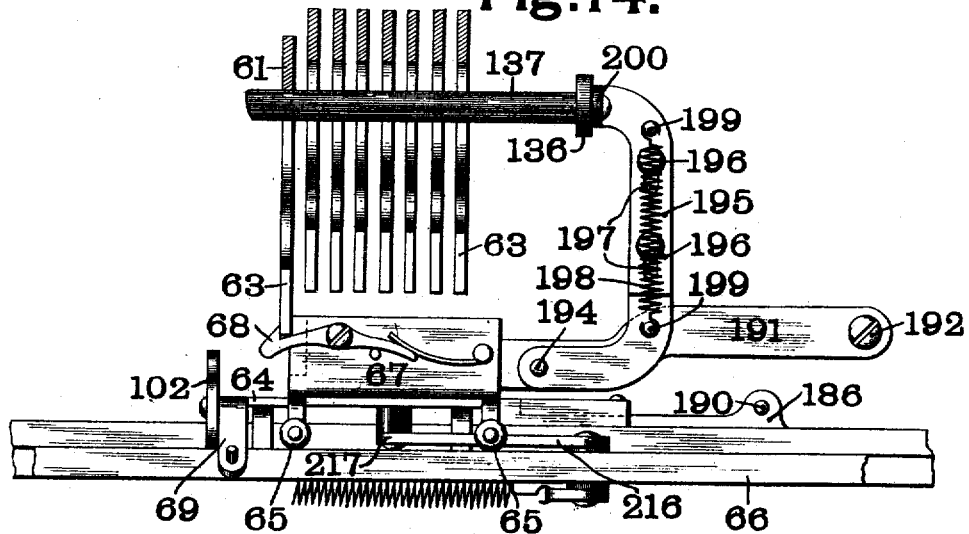
Fig. 14.
Fig. 15.
WITNESSES:
INVENTOR
G. N. Hinchman.
BY
ATTORNEYS.

G. N. HINCHMAN.
ADDING MACHINE.
APPLICATION FILED JULY 25, 1906.

916,445.

Patented Mar. 30, 1909.
27 SHEETS—SHEET 11.

Fig. 17.

WITNESSES:
Fred C. Henkel.
W. A. Alexander.

INVENTOR
G. N. Hinchman.
BY
John H. Bryson
ATTORNEYS.

G. N. HINCHMAN.
ADDING MACHINE.
APPLICATION FILED JULY 25, 1906.
916,445.
Patented Mar. 30, 1909.
27 SHEETS—SHEET 12.
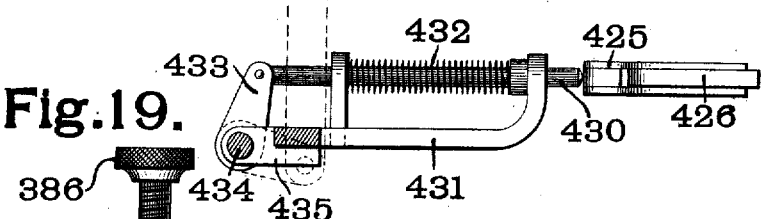
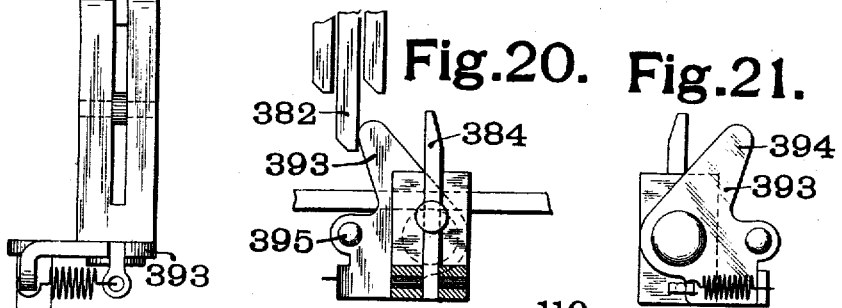
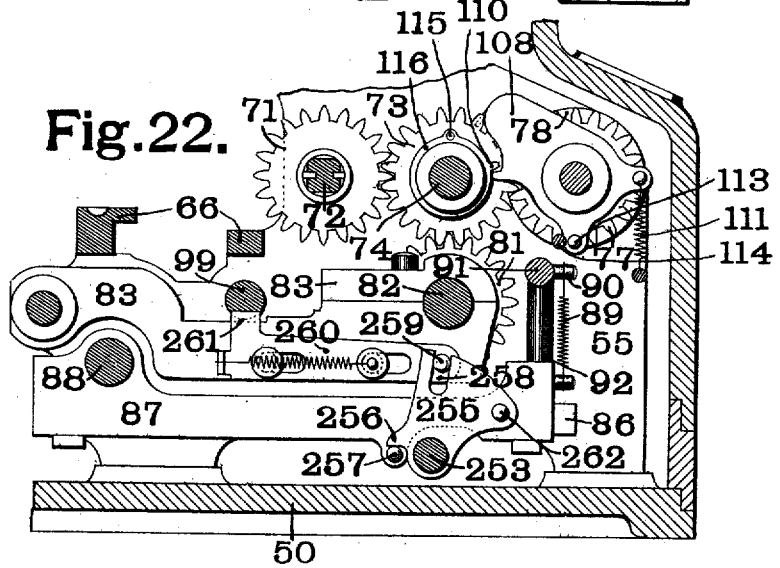
WITNESSES:
S. G. Stout
W. A. Alexander
INVENTOR
G. N. Hinchman
BY
Howk & Bryson
ATTORNEYS.

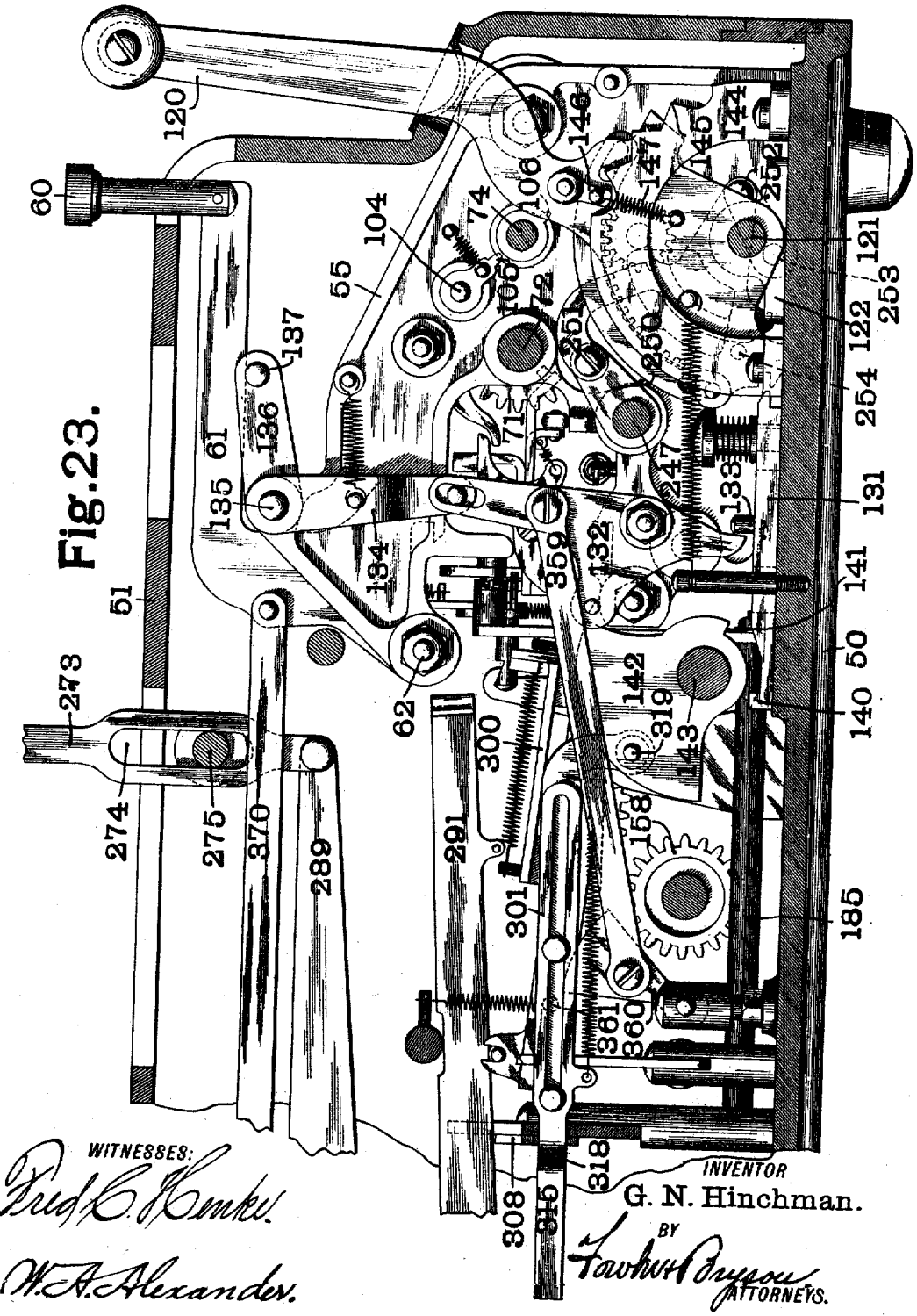

G. N. HINCHMAN.
ADDING MACHINE.
APPLICATION FILED JULY 25, 1906.
916,445.
Patented Mar. 30, 1909.
27 SHEETS—SHEET 14.
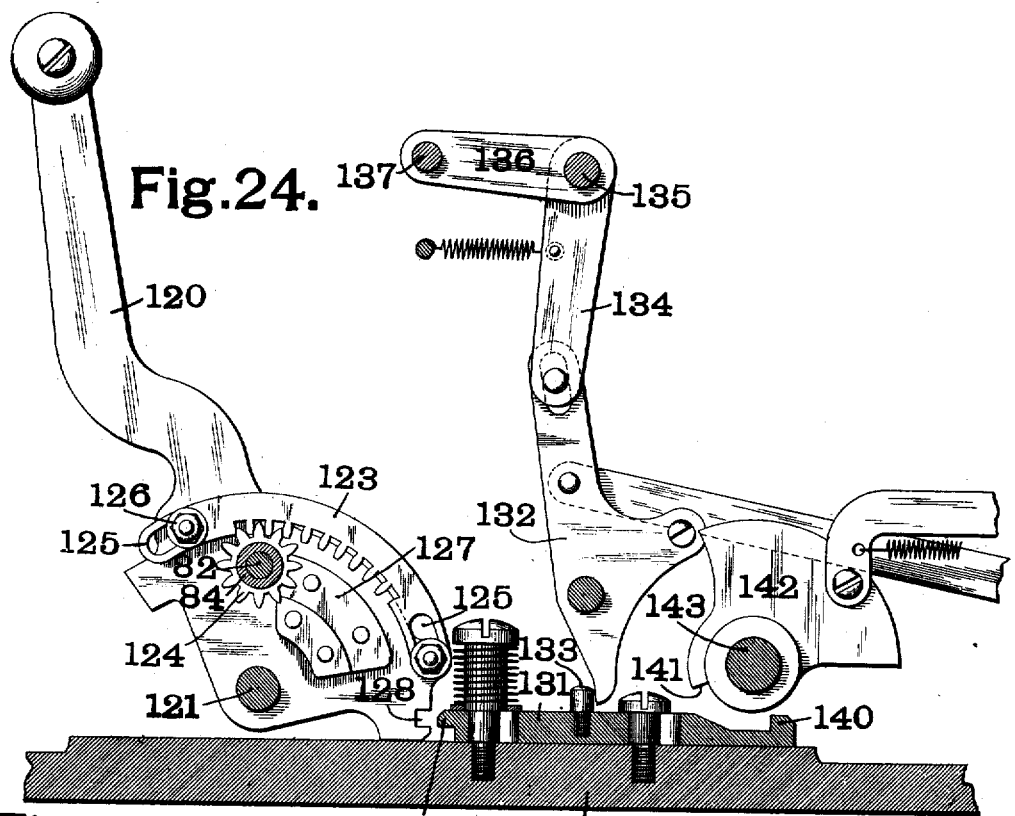
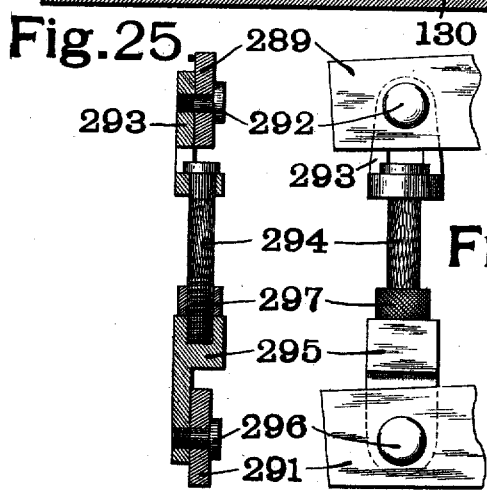
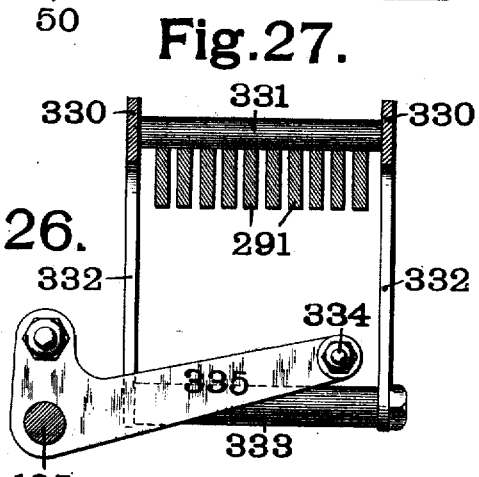
WITNESSES:
INVENTOR
G. N. Hinchman.
BY
ATTORNEYS.

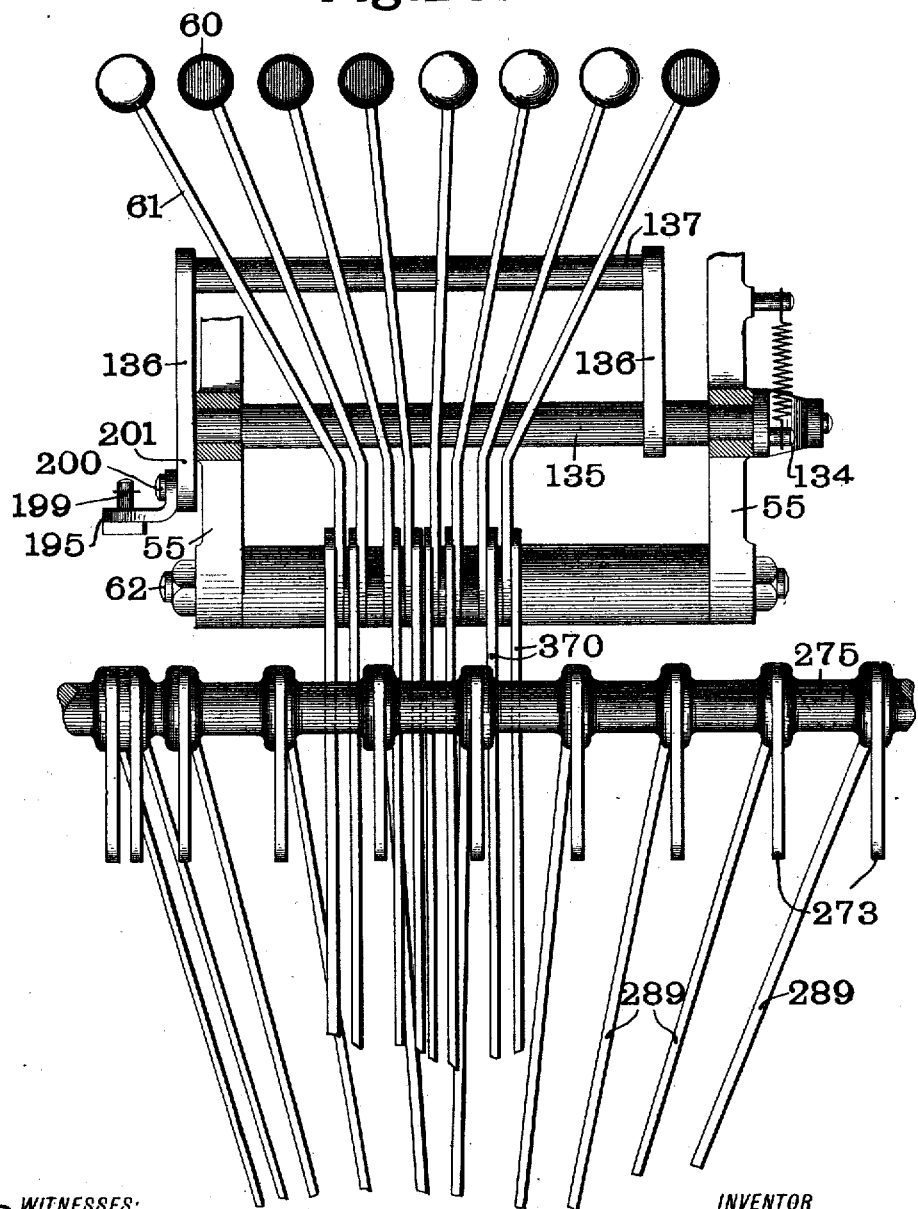

G. N. HINCHMAN.
ADDING MACHINE.
APPLICATION FILED JULY 25, 1906.

916,445.

Patented Mar. 30, 1909.
27 SHEETS—SHEET 16.

WITNESSES:

INVENTOR
G. N. Hinchman.
BY
ATTORNEYS.

G. N. HINCHMAN.
ADDING MACHINE.
APPLICATION FILED JULY 25, 1906.

916,445.

Patented Mar. 30, 1909.
27 SHEETS—SHEET 20.

WITNESSES:

INVENTOR
G. N. Hinchman.
BY
ATTORNEYS.

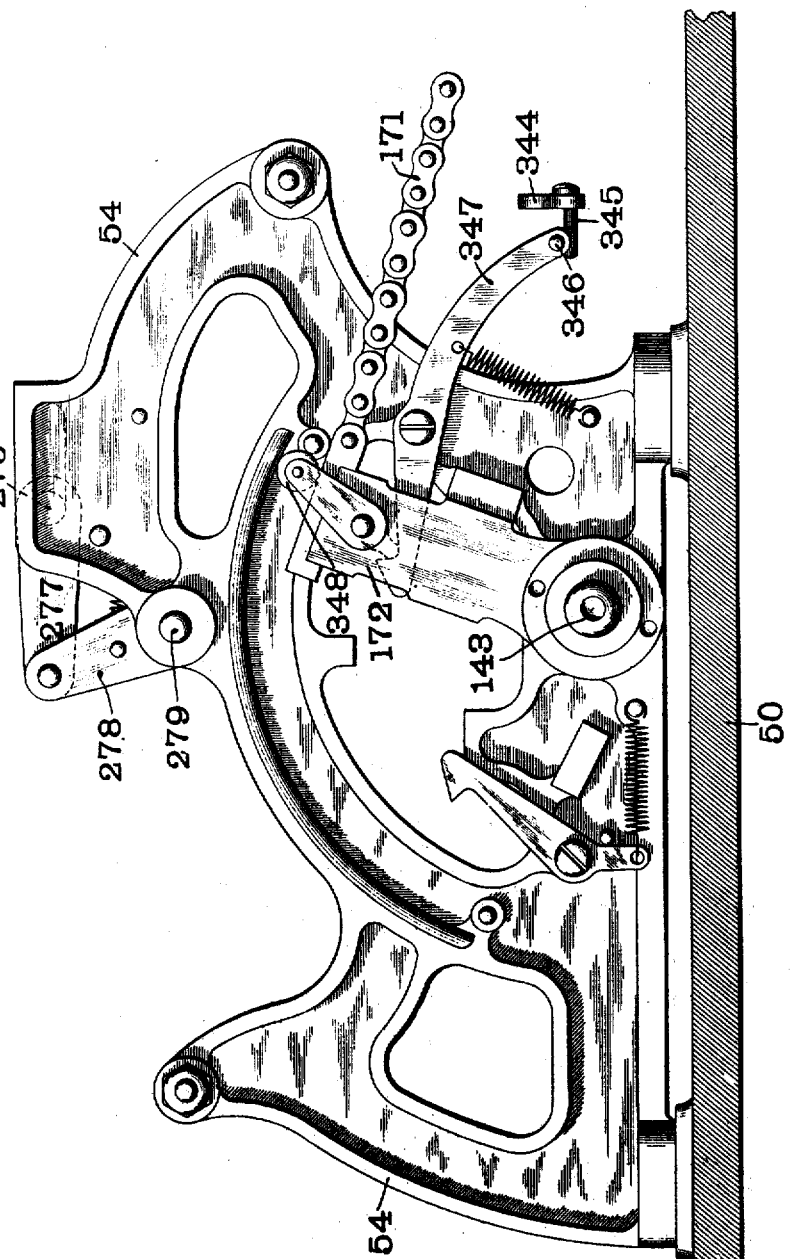

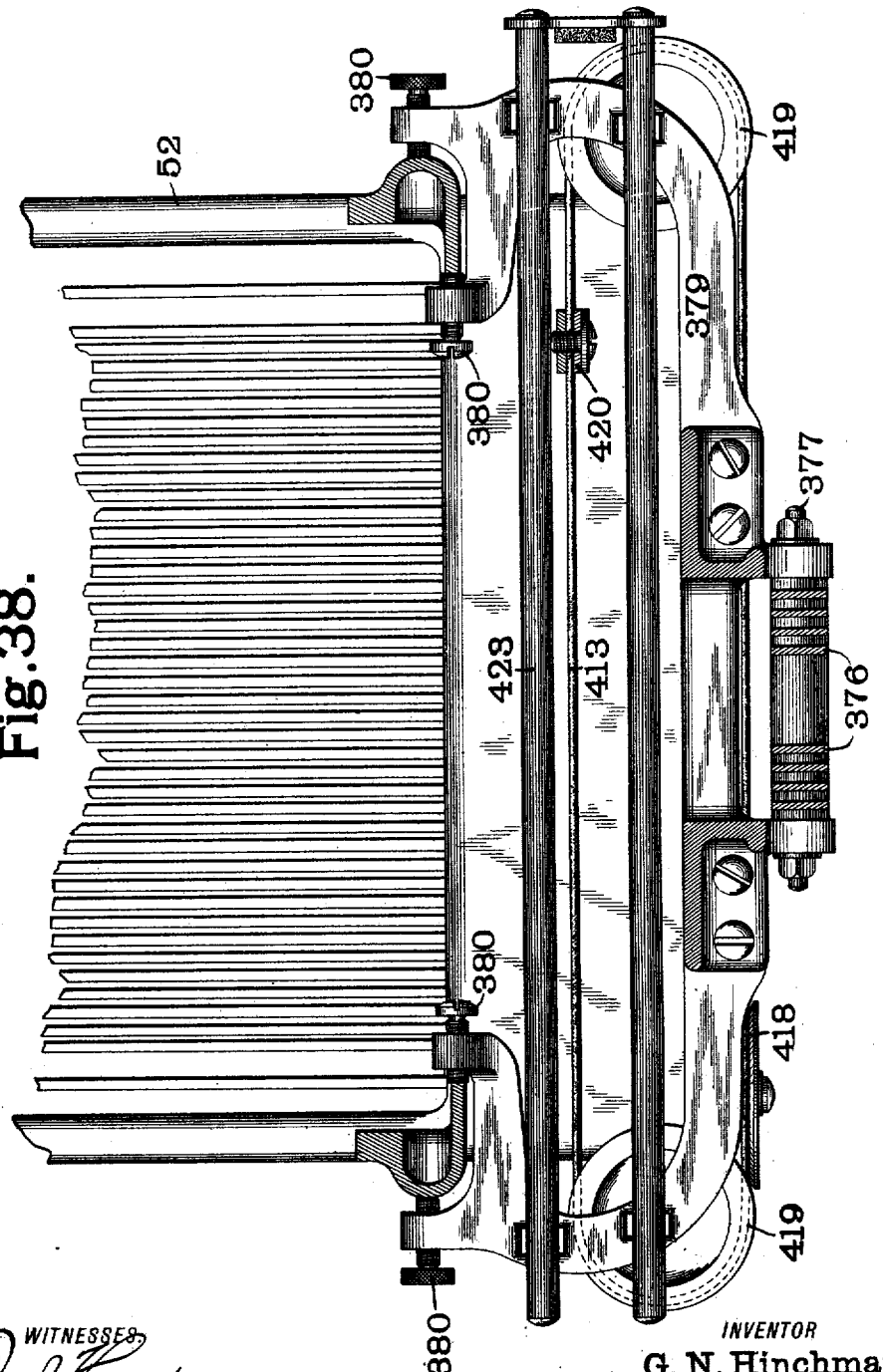

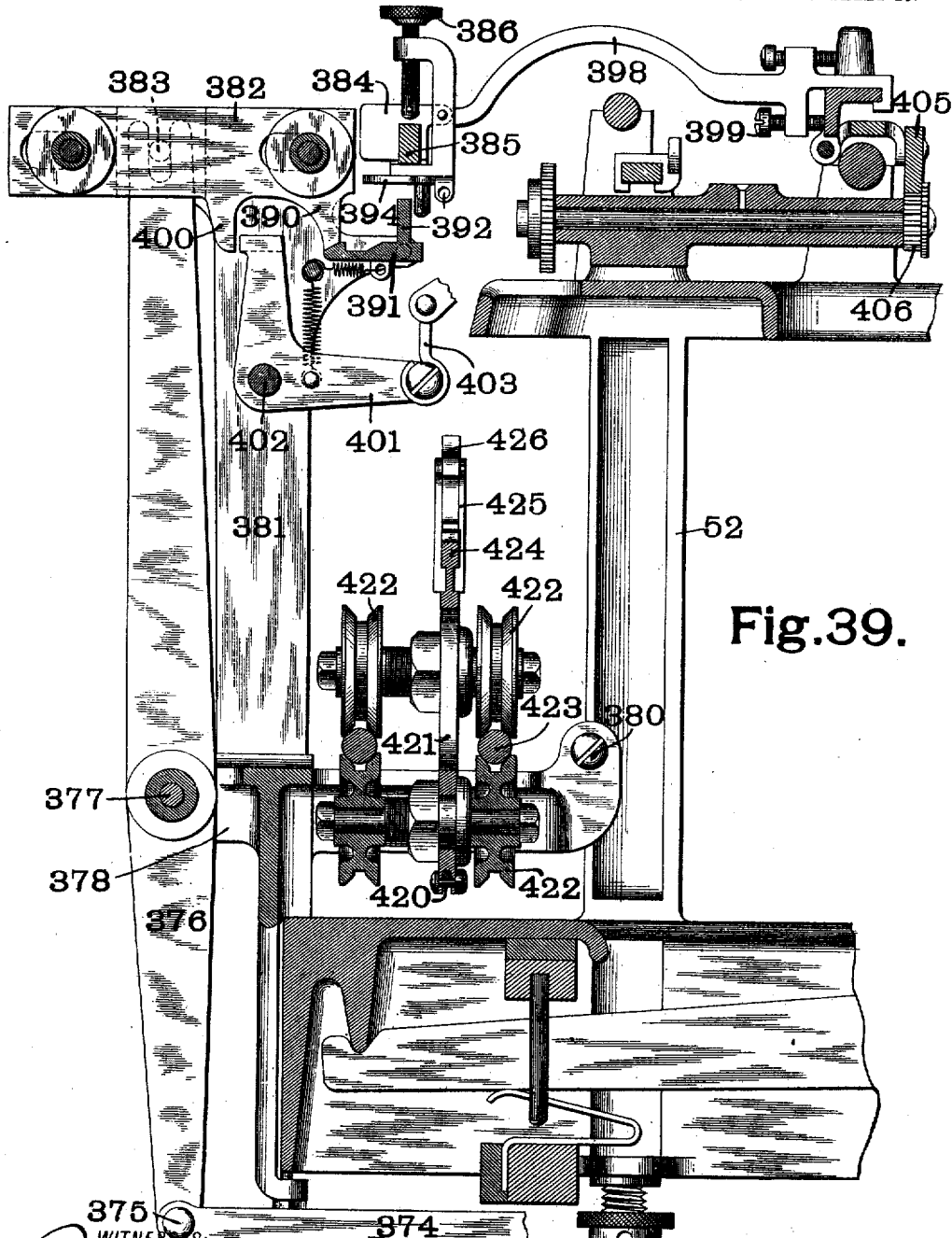

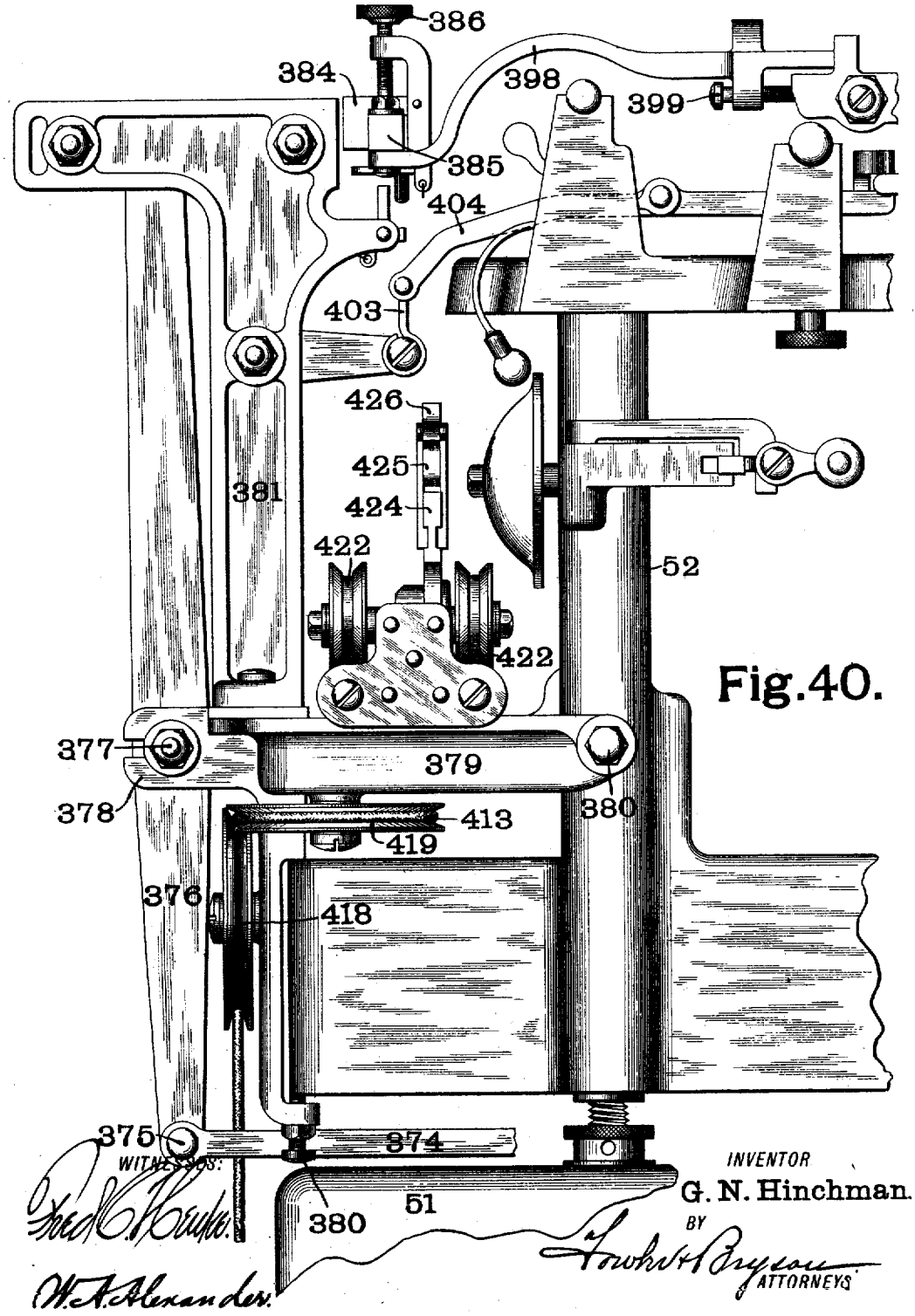

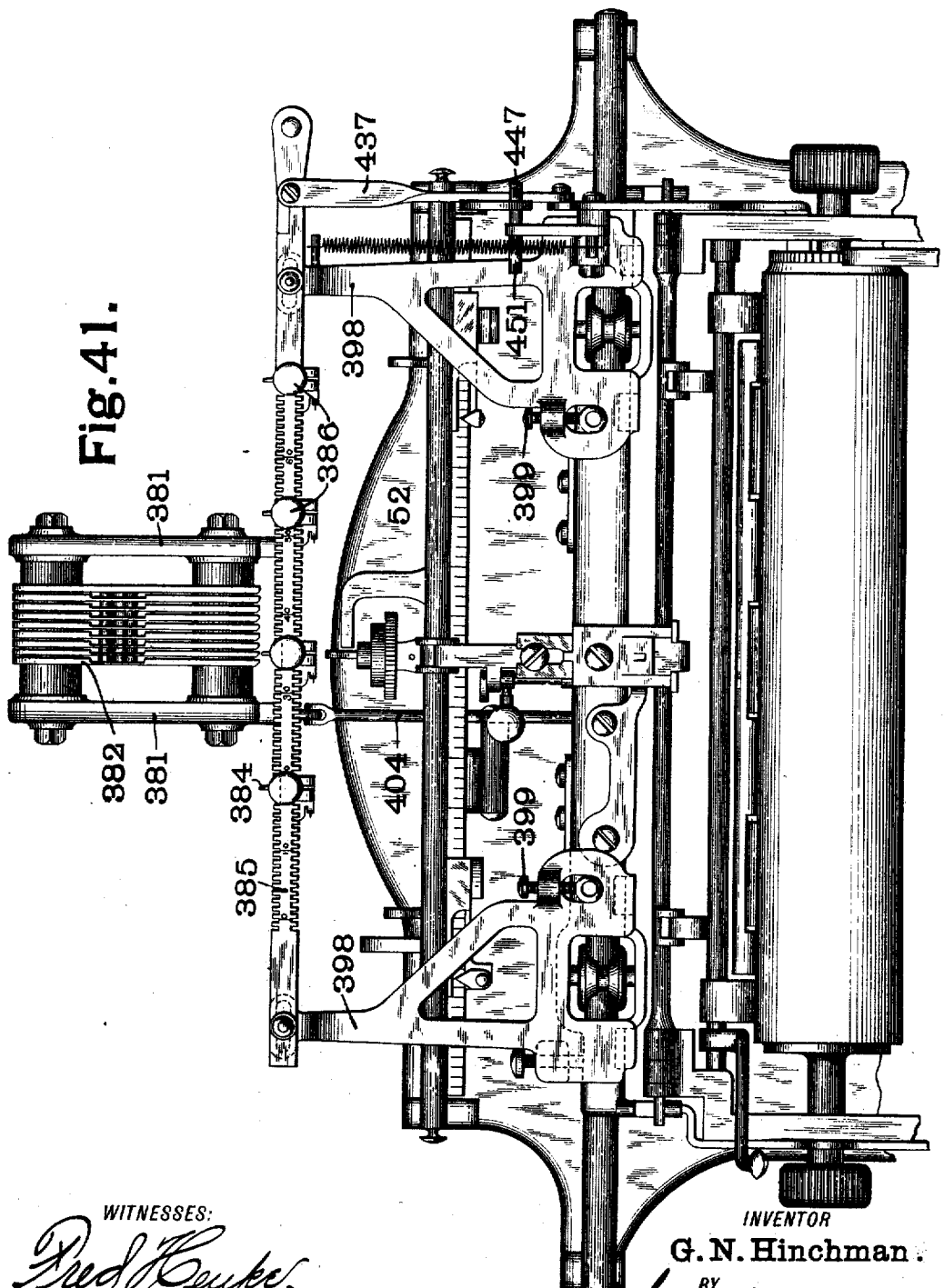

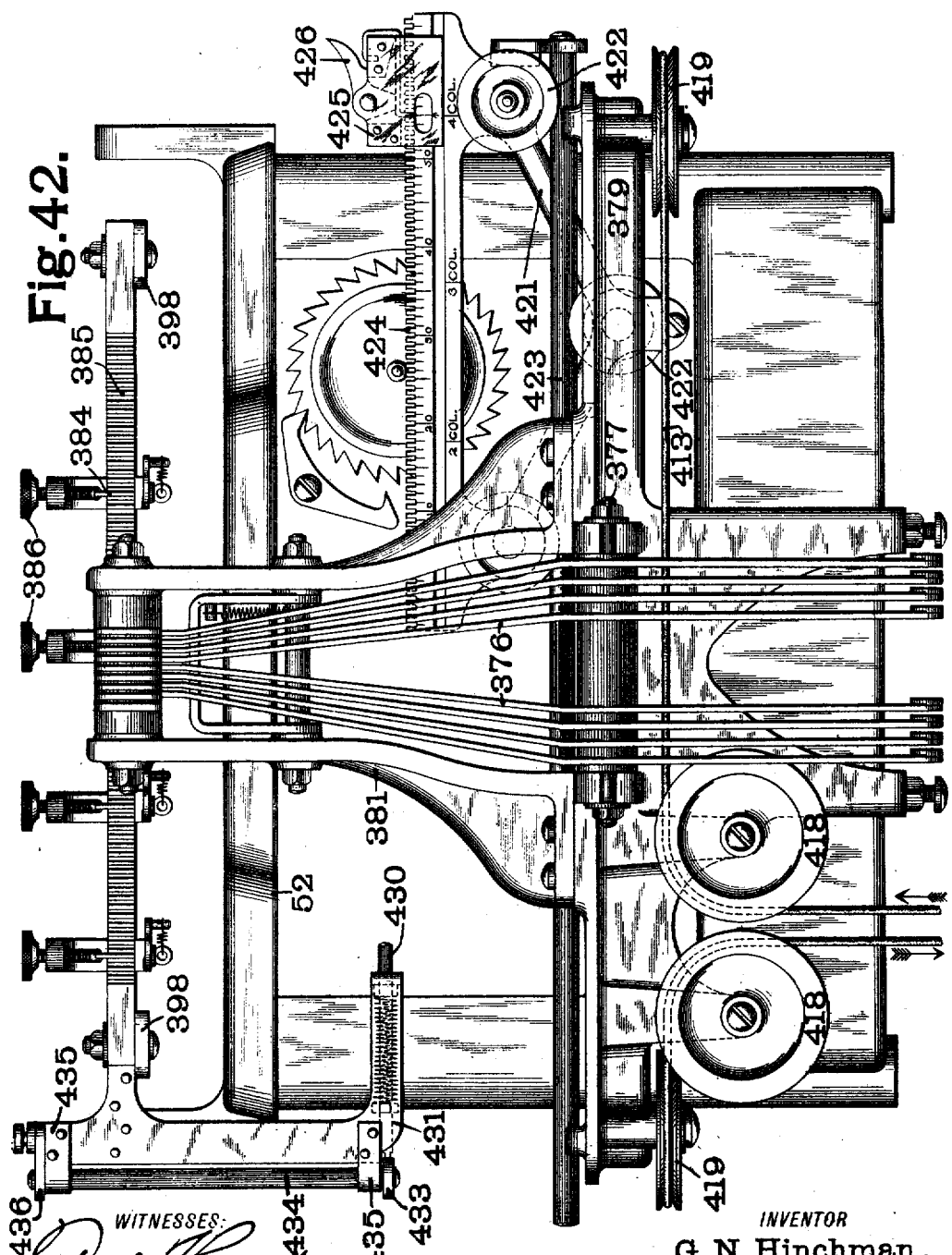

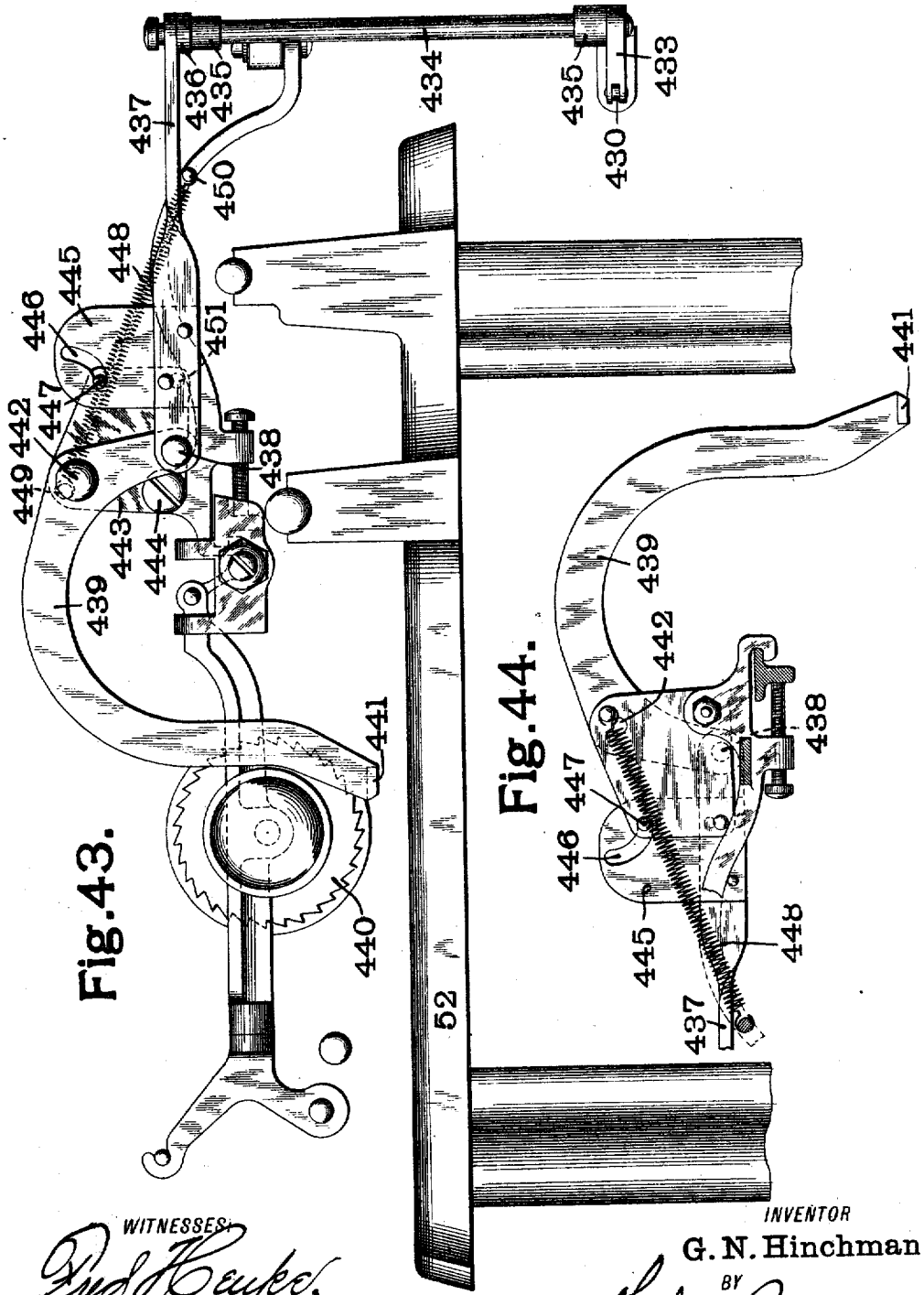

UNITED STATES PATENT OFFICE.

GEORGE N. HINCHMAN, OF WEBSTER GROVES, MISSOURI, ASSIGNOR TO STANDARD ADDING MACHINE COMPANY, OF ST. LOUIS, MISSOURI, A CORPORATION OF MISSOURI.

ADDING-MACHINE.

No. 916,445.  Specification of Letters Patent.  Patented March 30, 1909.

Application filed July 25, 1906. Serial No. 327,704.

*To all whom it may concern:*

Be it known that I, GEORGE N. HINCHMAN, a citizen of the United States, residing at Webster Groves, in the county of St. Louis and State of Missouri, have invented a certain new and useful Adding-Machine, of which the following is such a full, clear, and exact description as will enable any one skilled in the art to which it appertains to make and use the same, reference being had to the accompanying drawings, forming part of this specification.

The object of my invention is to provide an adding mechanism which may be used in conjunction with a type-writing machine of standard form, so that the adding mechanism may at will be operated from the numeral keys of the typewriting machine.

A further object of my invention is to provide means whereby the typewriter carriage may be controlled from the order keys of the adding machine, so as to adapt the combined typewriter and adding machine for tabulating.

I will now briefly describe my machine, as shown in the accompanying drawings. The adding mechanism proper is contained in a casing forming the base of the complete machine. This adding mechanism, while considerably different in form, is substantially the same in operation as that shown in patent to Wm. W. Hopkins, No. 683,939 and known as the Standard Adding Machine. The adding mechanism, however, is not provided with numeral keys, but only with order keys. Secured upon the base containing the adding mechanism is a typewriting machine of standard form, preferably a Remington typewriter. The adding mechanism is adapted to be thrown into or out of engagement with the numeral keys of this typewriting machine. The typewriting machine is also provided with a tabulator which is connected with the order keys of the adding mechanism so that the said order keys may simultaneously control the carriage of the typewriter and the carriage or translating device of the adding machine.

Figure 8:
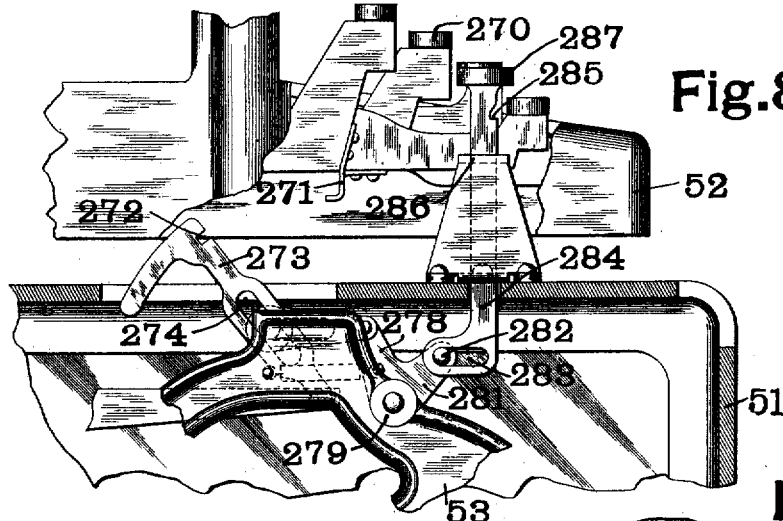
Figure 9:
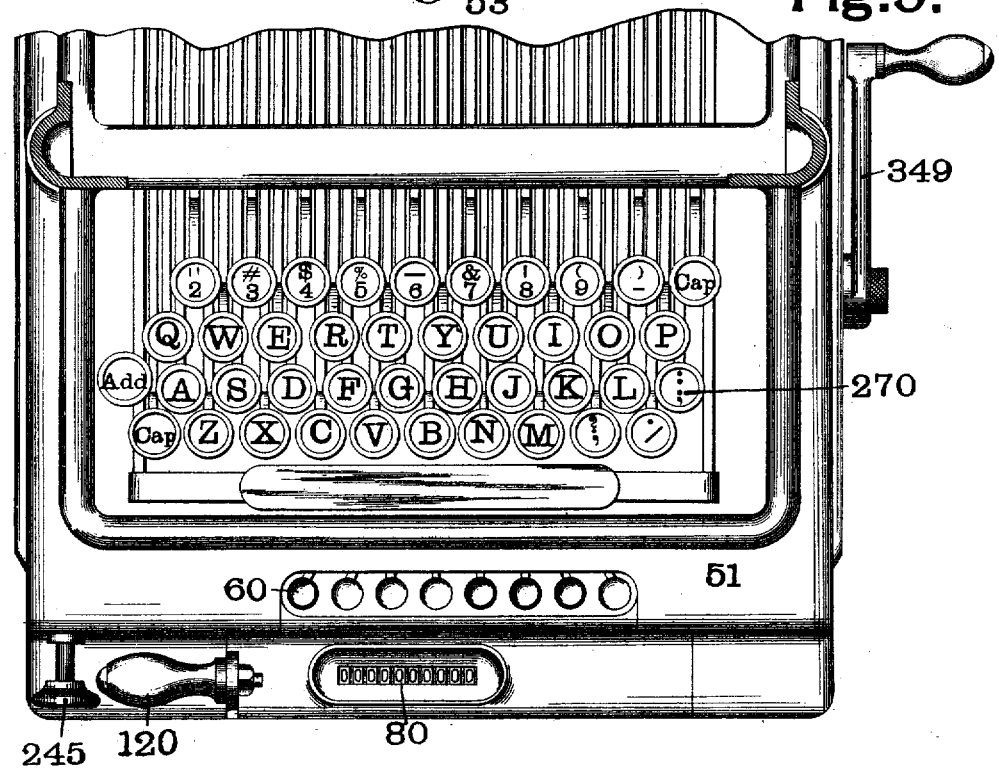
Figure 10:
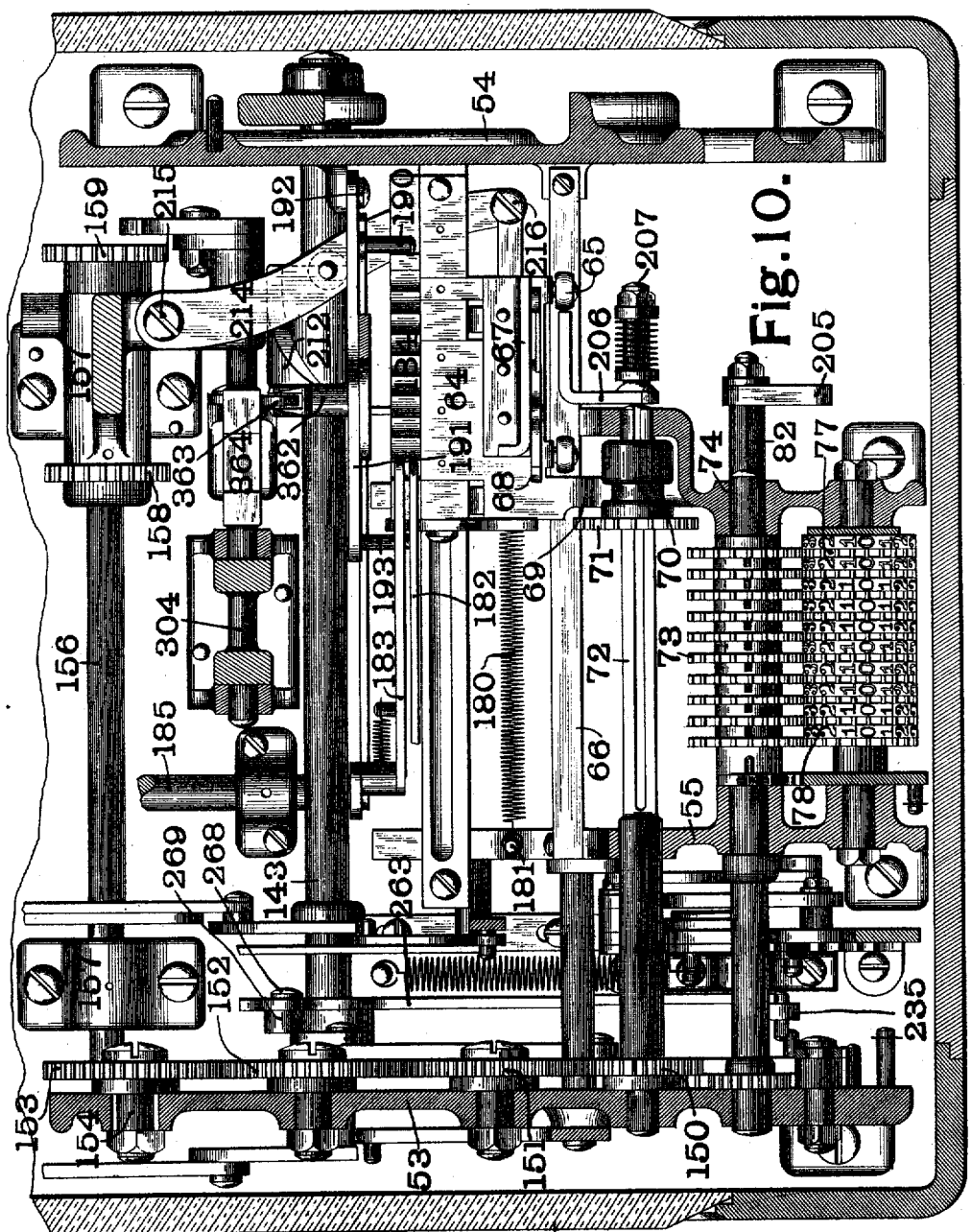
Figure 11:
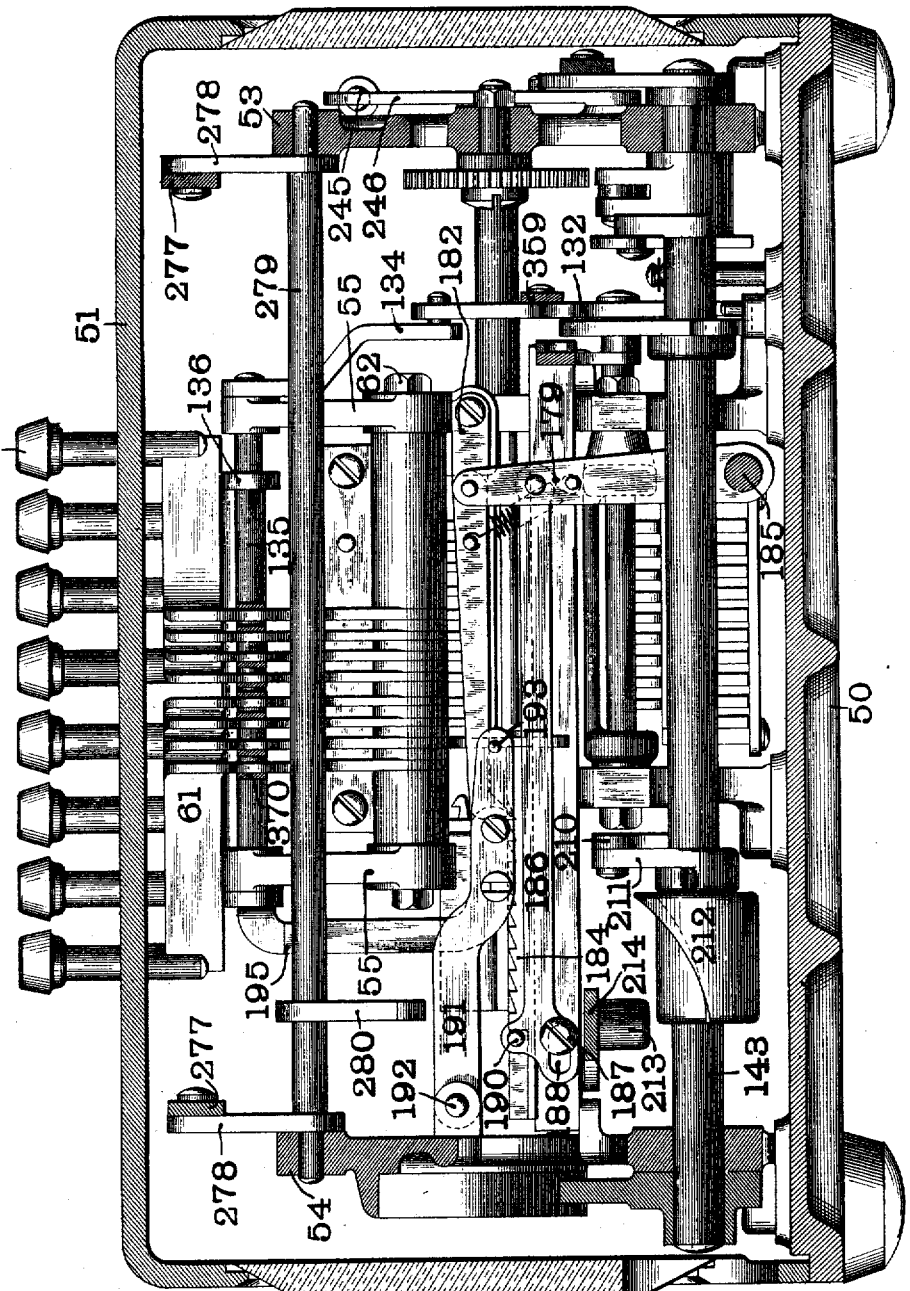
Figure 12:
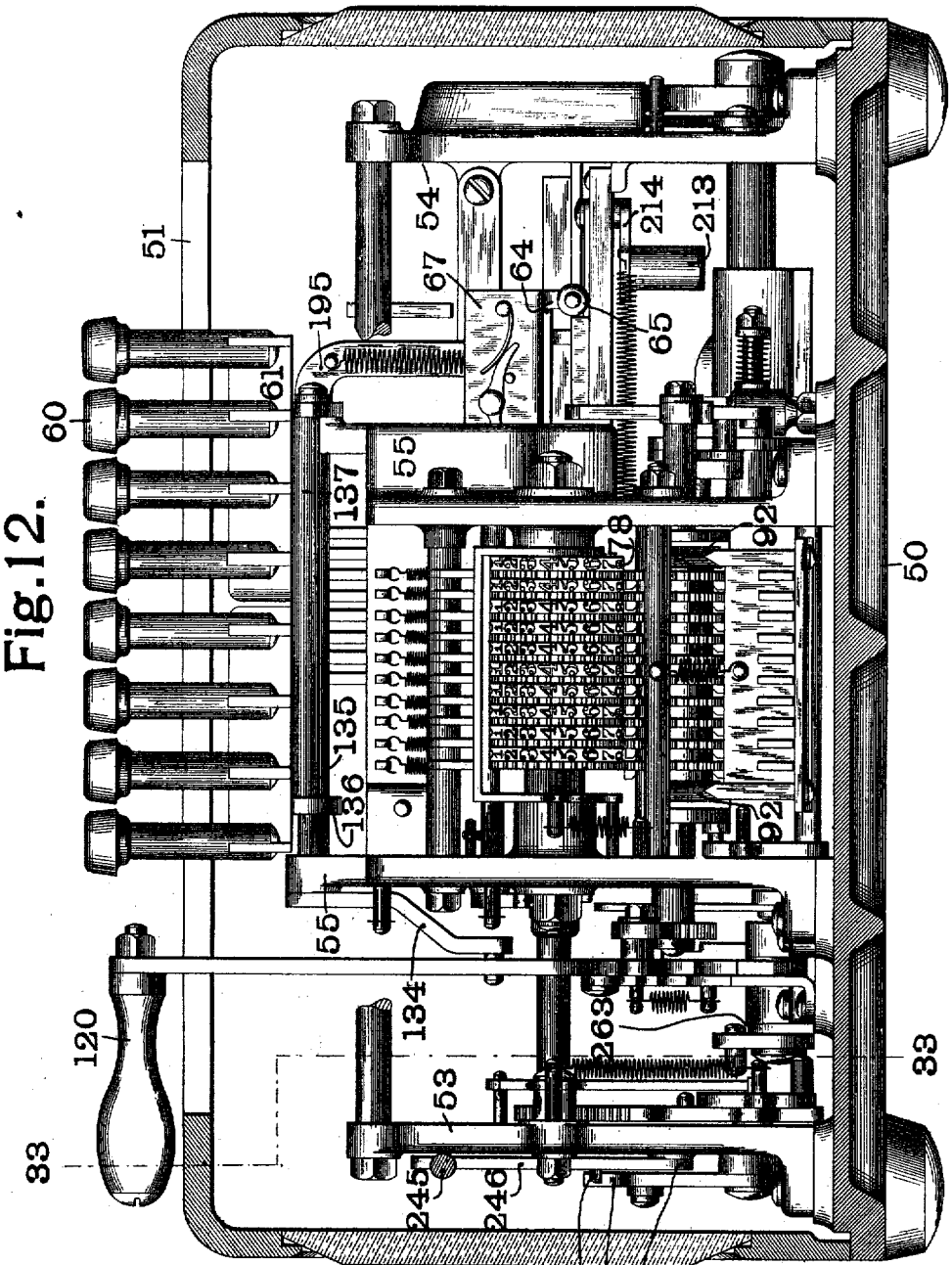
Figure 16:
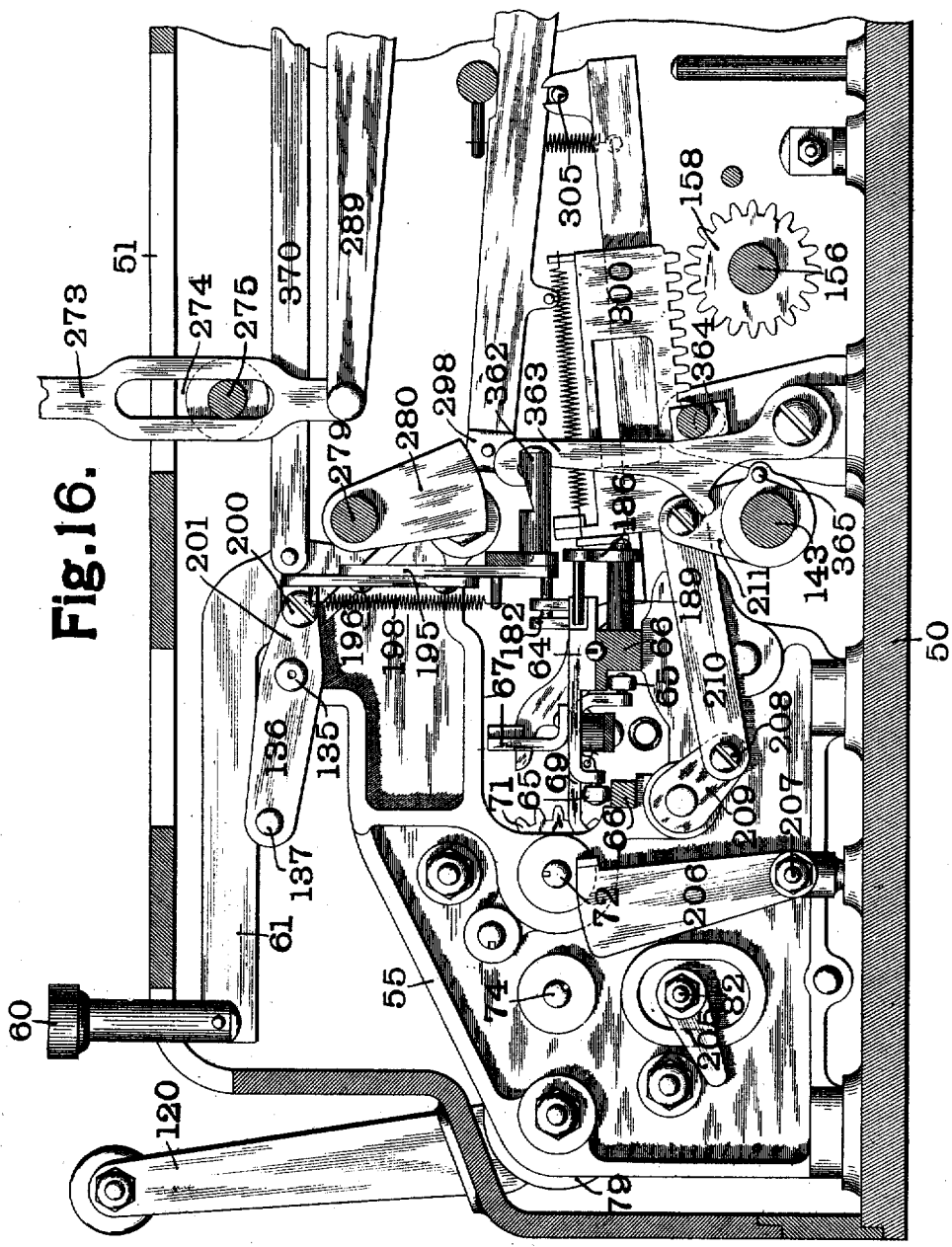
Figure 29:
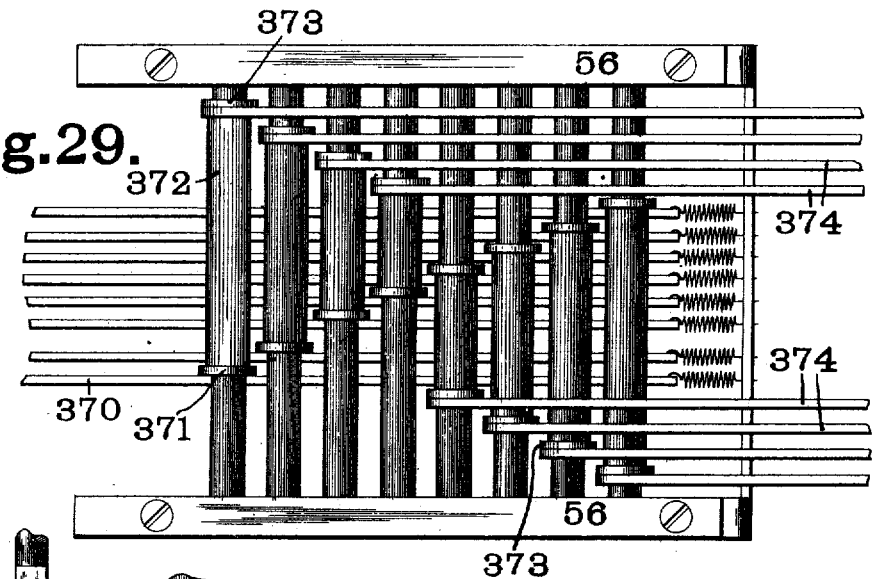
Figure 30:
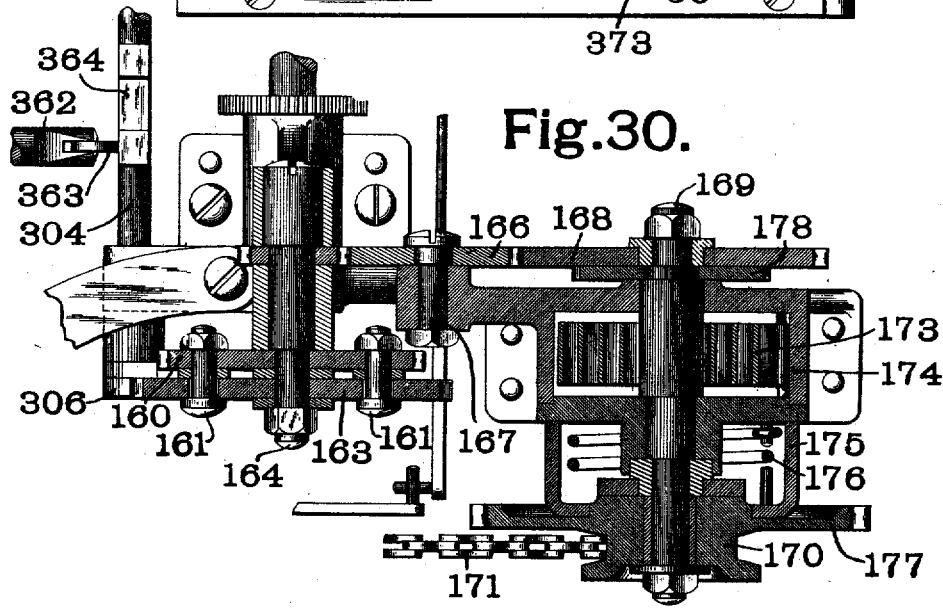
Figure 31:
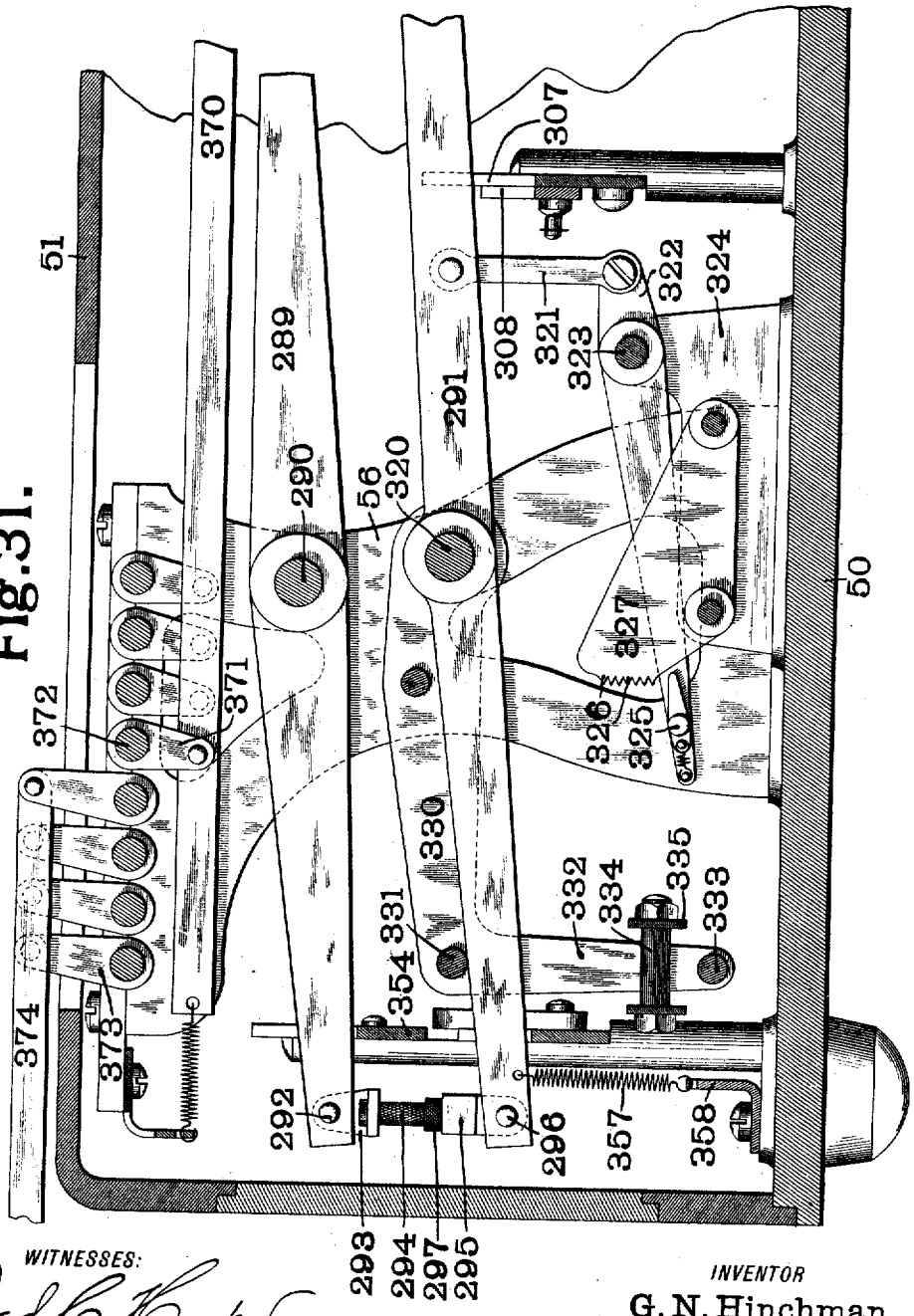
Figure 32:
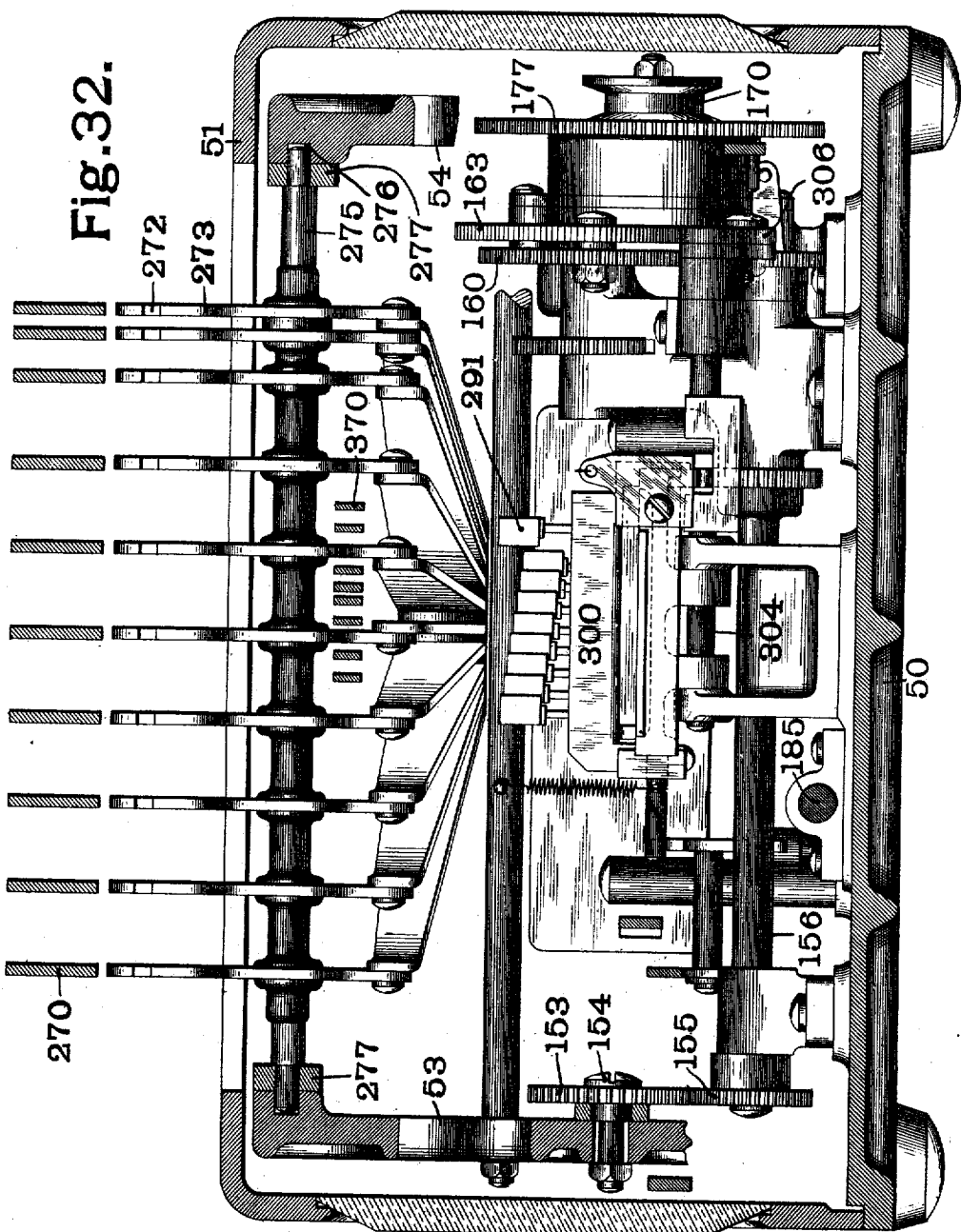
Figure 33:
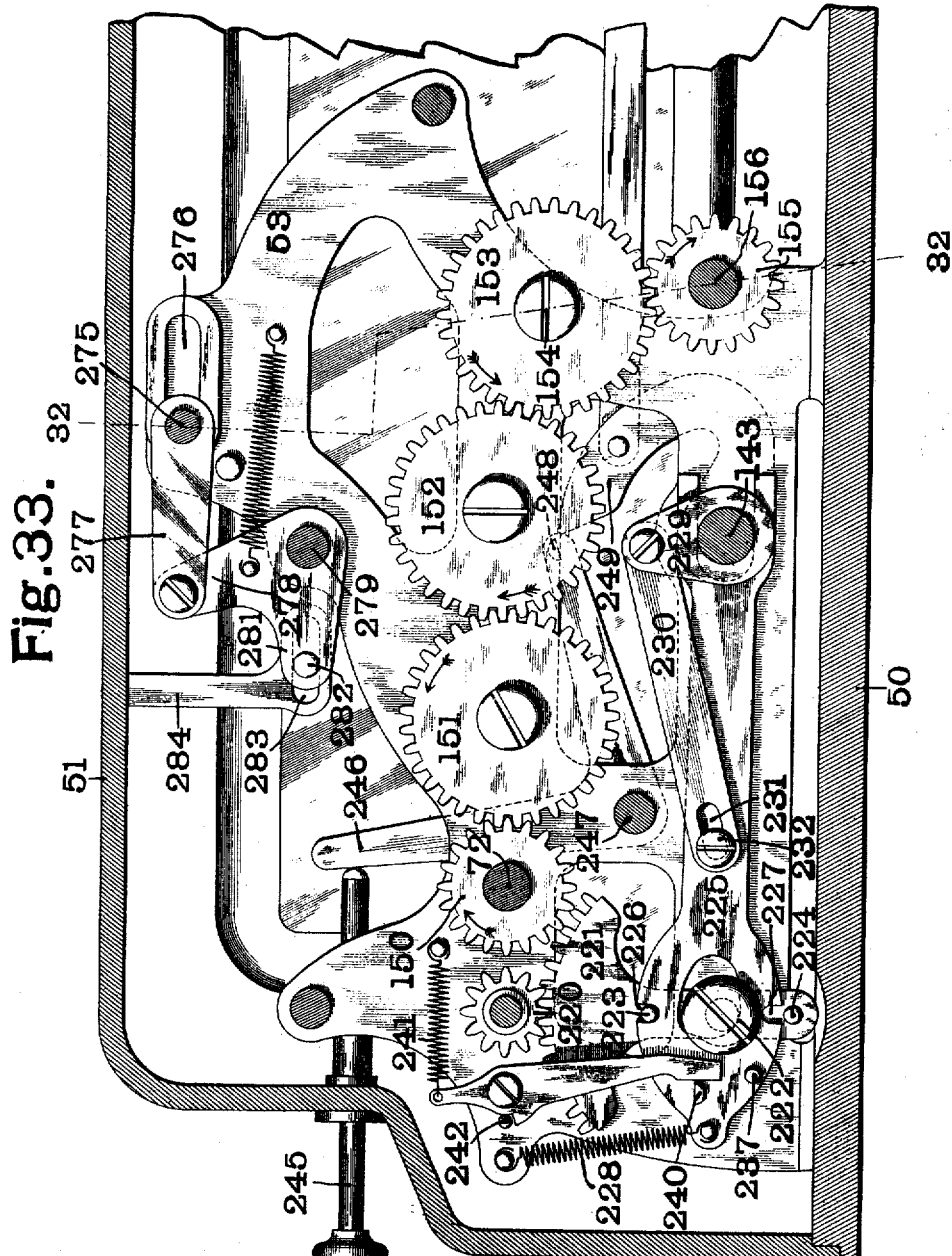
Figure 34:
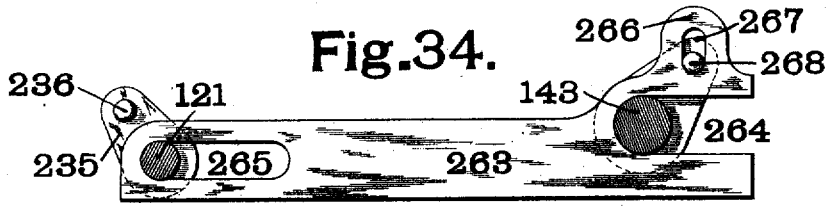
Figure 35:
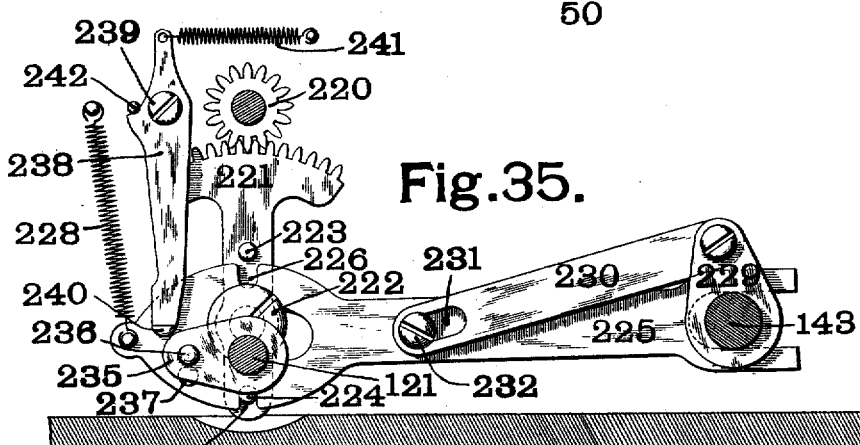
Figure 36:
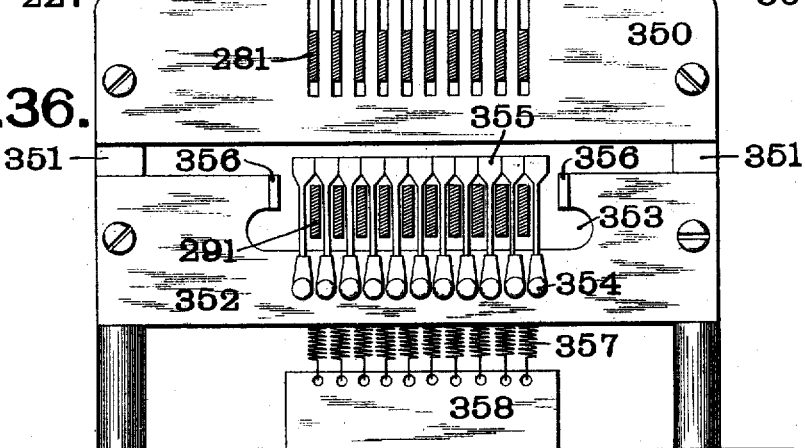

In the accompanying drawings, which illustrate one form of adding machine made in accordance with my invention, Figure 1 is a side view showing the adding mechanism and a portion of the typewriting machine, the casing of the adding mechanism being shown in section; Fig. 2 is a view similar to Fig. 1, but looking from the opposite side; Fig. 3 is a vertical central section through the parts shown in Figs. 1 and 2; Fig. 4 is a detail view showing the means for locking the numeral key bars of the adding mechanism; Fig. 5 is a detail view of the escape mechanism of the adding machine; Fig. 6 is a detail view showing the gearing for transmitting the power from the motor; Fig. 7 is a section on the line 7—7 of Fig. 4; Fig. 8 is a detail view showing the means for engaging the adding mechanism with and disengaging the same from the numeral keys of the typewriter; Fig. 9 is a top plan view showing the keyboard of the adding machine and typewriter; Fig. 10 is an enlarged horizontal section through the forward part of the adding mechanism; Fig. 11 is a vertical section on the line 11—11 of Fig. 17; Fig. 12 is a front elevation of the parts shown in Fig. 11, the casing being shown in section; Fig. 13 is a detail view showing the locking mechanism for the carriage feed of the adding machine; Fig. 14 is a detail view of the adding machine carriage; Fig. 15 is an enlarged detail view showing means for preventing over rotation of the adding wheels; Fig. 16 is an enlarged vertical section through the forward part of the adding machine; Fig. 17 is an enlarged vertical section through the center of the forward portion of the adding machine; Figs. 18, 19, 20 and 21 are enlarged views showing details of the tabulating mechanism; Fig. 22 is a view showing some of the parts operated by the error key; Fig. 23 is a vertical section through the forward part of the machine showing the total lever and some of the parts operated thereby; Fig. 24 is a detail view of the total lever; Figs. 25 and 26 are detail views showing the connection between the two sets of numeral key bars; Fig. 27 is a detail view showing mechanism for operating the adding machine carriage feed; Fig. 28 is a top plan view of the order keys, together with the order key bars and the numeral key bars; Fig. 29 is a top plan view of some of the parts shown in Fig. 31; Fig. 30 is a sectional view showing the motor and escapement; Fig. 31 is a vertical central section through the rear portion of the adding machine casing; Fig. 32 is a section on the line 32—32 of Fig. 33; Fig. 33 is a section on the line 33—33 of Fig. 12; Fig. 34 is an enlarged detail view showing locking mechanism for the total lever; Fig. 35 is an enlarged detail view showing the reversing mechanism for taking the total; Fig. 36 is a detail view showing locking mechanism for the numeral key bars; Fig. 37 is a side elevation showing the full stroke mechanism for the handle; Fig. 38 is a vertical section through a portion of the tabulating mechanism and a portoin of the typewriter frame; Fig. 39 is a vertical central section through the tabulating mechanism and the rear portion of the typewriting machine; Fig. 40 is a side elevation of the parts shown in Fig. 39; Fig. 41 is a top plan view of the parts shown in Figs. 39 and 40; Fig. 42 is a rear view of the parts shown in Fig. 41; Fig. 43 in an enlarged detail view showing the mechanism for feeding the typewriter platen; and Fig. 44 is a detail view of some of the parts shown in Fig. 43, looking from the opposite side.

Like marks of reference refer to similar parts in the several views of the drawings.

50 represents the base of the adding machine mechanism. This base 50 supports a casing 51 within which is contained all of the adding machine mechanism proper, the parts 50 and 51 serving as a base for the typewriting machine 52, which may be of any suitable form, but which I have shown as the standard form of Remington typewriter. Carried by the base 50 within the casing 51 are castings 53 and 54, which form the main frames for the forward portion of the adding machine. Between these frames 53 and 54 are frames 55, between which are journaled the adding wheels, the recording wheels and the intermediate wheels meshing with said adding and recording wheels. The base 50 also carries two rear frames 56, between which are pivoted the numeral key bars together with the bars connecting the order keys with the tabulating mechanism.

Having reference now more particularly to Figs. 3, 10, 14 and 17, 60 are the order keys, each of which is carried upon an L-shaped order key bar 61. These key bars 61 are pivoted upon a shaft 62, (Fig. 17), carried in the frames 55. Each of the key bars 61 has a forwardly projecting part 63 adapted to be thrown into the path of the adding machine carriage when the key 60 is struck, as best shown in Fig. 14.

The carriage of the adding machine consists of a base plate 64, (see also Fig. 10), provided with rolls 65 running on tracks 66 carried by the frames 55. The base plate 64 carries an upwardly extending plate 67, which is adapted to come in contact with the forward projections 63 of the bars 61 hereinbefore described. In order to prevent the carriage from rebounding from the bars 61 after coming in contact with the same, I provide the plate 67 with a detent 68 pivoted to the forward side of said plate and adapted to engage with the forward projection 63 on the bar, as shown in Fig. 14. The carriage 64 has a forward projection 69 which engages with a peripheral groove in a hub 70 upon a sliding gear 71. (See Fig. 10). This gear 71 is mounted upon a shaft 72 so as to slide longitudinally thereof, but to be incapable of independent rotation. The gear 71 is adapted to successively mesh with intermediate gears 73 loosely mounted upon a shaft 74 journaled in the frames 55. The shaft 74 is provided with a comb 75, (Fig. 17) adapted to engage with pins 76 on the intermediate wheels 73. The wheels 73 mesh with wheels 77, each of which has attached to it a drum 78, upon which appear the numerals, so as to be visible through an opening 80 in the casing 51, as best shown in Fig. 9. The intermediate wheels 73 also mesh with adding wheels 81 loosely mounted upon a shaft 82 journaled in a swinging frame 83. The shaft 82 is provided with a longitudinally sliding comb 84. This comb 84 is adapted to be moved longitudinally by the total lever, as will be hereinafter described. The comb 84 when so moved is adapted to contact with lugs 85 on the adding wheels 81. Coöperating with the adding wheels 81 are carrying bars 86 carried in a frame 87 pivoted upon a shaft 88 carried in the side frames 55. The frame 87 is held in its normal position by means of a spring 89 secured at one end to said frame and at the other to a pin 90 carried by a rod 91 secured in the frames 55. This rod 91 is provided with stops 92, which limit the movement of the frame 87. (See also Fig. 12). The carrying bars 86 are held in their normal position by means of pawls 93, each of which is provided with a pin 94 adapted to be engaged by a releasing lever 95 having a beveled end 96 adapted to be struck by the lugs 85 on the adding wheels 81. In order to return the carrying bars 86 to their normal position after being released, I provide said bars with upward extensions 97 adapted to be engaged by a blade 98 carried by a rock shaft 99. This rock shaft 99 is also adapted to swing the frame 83 upon its pivot except when the error key is operated, as will be hereinafter more fully described. The intermediate wheels 72 are normally prevented from rotating by means of centering pawls 100 mounted upon a rod 101 in the side frames 55. The centering pawls 100 are adapted to be engaged and released by a releasing pawl 102, (see also Fig. 14) pivoted to the end of the carriage 64 and operated upon the movement of the numeral key bars, as will be hereinafter described.

In order to prevent the over rotation of the intermediate and adding wheels I provide a comb 103 adapted to be thrown into the path of the pins 76 on the intermediate wheels 73. This comb 103 is carried by a rock shaft 104. The rock shaft 104 is operated upon each pull of the handle by means of a tooth 105 carried by said shaft at the outside of the left hand frame 55, as shown in Fig. 23. Said tooth 105 is adapted to be engaged by a tooth 106 carried on the shaft 74 of the intermediate wheels 73. In order to prevent the over rotation of the wheels 73 in the opposite direction when taking the total, I provide a second comb 107 carried by arms 108 pivoted on the shaft of the registering wheels 77. (See also Fig. 15). One of the arms 108 is provided with a tooth 109 adapted to be engaged by a tooth 110. The comb 107 is held in its normal position by means of a spring 111 secured to one of the arms 108 at one end and at the other to a pin 112 carried in the side frame 55. The tension of the spring 111 holds a pin 113 in the said arm 108 against a pin 114 in the side frame 55. The comb 107 is thrown into the path of the pins 76 on the wheels 73 when the sum is taken by the contact of the comb 75 with a pin 115 on a ring 116 loosely surrounding the shaft 74 and carrying the tooth 110 hereinbefore referred to.

120 is the total lever best shown in Figs. 12, 23 and 24. The total lever 120 is mounted on shaft 121 journaled in a projection 122 carried by the base 50. The lever 120 has mounted thereon an internally toothed segment 123, which segment is adapted to engage with a wheel 124 secured to the end of the shaft 82, on which are mounted the adding wheels 81. The segment 123 is provided at each end with a slot 125, through which passes a bolt 126 into the total lever 120. The object of this is to allow of relative movement between the lever 120 and the segment 123, so that the said segment may remain idle during the first part of the movement of the total lever 120. The total lever 120 also carries a cam block 127, which is adapted to engage with the end of the comb 84 of the shaft 82 and so move the said comb longitudinally to bring its teeth into the path of the lugs 85 on the adding wheels 81. In order to prevent the movement of the total lever 120 after the depression of one of the order keys 60 and before the handle has been operated, the said total lever is provided with a notch 128 adapted to be engaged by a tooth 130 on a sliding block 131. This block 131 is actuated by the contact of a lever 132 with a pin 133 carried on the said block, as best shown in Figs. 23 and 24. This lever 132 is actuated by an arm 134 rigidly secured to a shaft 135 mounted in the frames 55 and carrying arms 136 in which is mounted a rod 137 passing beneath the order key bars 61.

In order to release the tooth 130 from the notch 128 the rear end of the bar 130 is provided with a projection 140 adapted to be engaged by a shoulder 141 carried on a sector 142 rigidly mounted upon the handle shaft 143.

In order to compel the full stroke of the total lever 120 I secure to the base 50 adjacent to the said lever 120 a semi-circular part 144 provided with teeth 145 adapted to engage with a detent 146 pivoted to the lever 120, as shown in Fig. 23, and held by means of a coil spring 147, so that when a stroke of the lever 120 is begun the lever cannot return until the stroke is finished. The shaft 72, upon which is slidingly mounted the gear wheel 71, is provided at its left hand end with a gear wheel 150, (Figs. 10 and 33) which in turn meshes with a wheel 151. The wheel 151 in turn meshes with a wheel 152. The wheel 152 meshes with a wheel 153 mounted on an adjustable stud 154, and the said wheel 153 meshes with a wheel 155 rigidly mounted on a shaft 156 journaled in bearings 157 and provided with gear wheels 158 and 159. The wheel 158 is driven from mechanism controlled by the numeral key bars, as will be hereinafter described, while the wheel 159 meshes with a wheel 160 adjustably secured by means of bolts 161 passing through slots 162 to the escape wheel 163. (Figs. 5 and 6). The escape wheel 163 has rigidly secured on its shaft 164 a small gear wheel 165, which meshes with a wheel 166 carried by a stud 167 and in turn meshing with a wheel 168 which is driven by the spring motor. The wheel 168 is loosely mounted on a shaft 169 on the opposite end of which is mounted a pulley 170, around which passes a sprocket chain 171 leading to an arm 172, carried by the main or handle shaft 143. The shaft 169 has secured to it one end of a coil spring 173, the opposite end of which is secured to the motor casing 174. The motor casing 174 is provided with a cap 175 in which is an auxiliary spring 176 for returning the cap, together with its attached wheel 177, to normal position. This wheel 177 is for moving the typewriter carriage, as will be hereinafter described.

The wheel 168 has arranged adjacent to it on the shaft 169 a ratchet wheel 178, by means of which the movement of the spring motor is communicated to the said wheel 168. The carriage 64 hereinbefore referred to is drawn toward the left hand side of the machine by means of a coil spring 180 attached at one end to said carriage and at the other to a pin 181 in the side frame 55, (Fig. 10). The carriage is normally prevented from moving under the tension of this spring by means of two dogs 182 and 183 engaging with a rack 184 on the said carriage. The dog 182 is pivoted to the side frame 55, (see Fig. 11) while the dog 183, which acts as a feed dog, is pivoted to a lever 179 mounted on a rock shaft 185 which is operated by the movement of the numeral key bars, as will be hereinafter described. The lever 179 is provided with an arm 186 slidingly attached to one of the carriage guides 66 by means of a screw 187 passing through a slot 188 in the said arm 186 and into a stud 189 (Fig. 16) carried by the said guide 66. This arm 186 is provided with a pin 190 arranged in the path of the rack 184 on the carriage so as to prevent further movement of the numeral keys after the carriage has reached its extreme position to the right. In order to disengage the dogs 182 and 183 from the rack 184 an arm 191 pivoted to the side frame 54 at 192, as best shown in Figs. 10 and 11, is provided with a pin 193 extending below said pawls 182 and 183. This arm 191 has pivoted to it at 194 a bent link 195 (Fig. 14) formed in two parts slidingly connected by means of bolts 196 passing through slots 197 in one of the parts and secured in the other part. The two parts of the link 195 are normally held together by means of a spring 198 secured to pins 199 on each of the parts. The upper part of the link 195 is pivoted at 200 to the projecting end 201 of the right hand lever 136, as best shown in Fig. 16. It will be evident that in case no obstruction is encountered the two parts of the link 195 will move as though the link were made in a single piece, owing to the tension of the spring 198. In case, however, an obstruction is placed in the path of the arm 191, as will be hereinafter described, the lower part of the link 195 will not be moved, the two parts simply separating against the tension of the spring 198, so that the pawls will not be released by the movement of the order key.

In order to prevent the movement of the carriage 64 toward the left when the total lever 120 is operated, I provide the shaft 82, which is rotated by said lever 120, with an arm 205 (Figs. 10 and 16) adapted to engage with a lock 206 pivoted to the base 50 at 207, as best shown in Fig. 16. This lock 206 is adapted to be moved in the path of one of the rolls 65 of the carriage 64, as best shown in Fig. 10, so that the carriage cannot be moved toward the left. The lock 206 will remain in this position until released by contact with a pin 208 carried by an arm 209 rigidly secured to the end of the shaft 99 hereinbefore described. The arm 209 is connected by means of a link 210 with an arm 211 rigidly secured to the handle shaft 143.

In order to return the carriage 64 to its normal position upon the pull of the handle 172 I provide the handle shaft 143 with a cam 212 (Figs. 6 and 10) adapted to engage with a roller 213 upon the lower face of a curved arm 214 pivoted at 215 to a projection on one of the bearings 157 and at the opposite end pivoted to a link 216, the opposite end of which is pivoted to the under side of the carriage 64 at 217, as best shown in Fig. 14.

In order to rotate the shaft 74 upon the operation of the main handle, I provide the said shaft 74 with a gear wheel 220 meshing with a toothed sector 221, as shown in Figs. 33 and 35.

In the ordinary operation of the machine it is necessary to rotate the shaft 74 in one direction, while when taking the total it is necessary to rotate the said shaft in the opposite direction. In order to accomplish this I pivot the sector 221 to the side frame 53 by means of a stud 222 and provide the said sector with pins 223 and 224, one being placed above the pivot 222 and the other at an equal distance below the said pivot. A slotted link 225 surrounds the pivot 222 and is provided with notches 226 and 227, the former being adapted to engage with the pin 223 and the latter with the pin 224.

In the normal operation of the machine the link 225 is held in such position, by means of a spring 228, that the notch 226 engages with the pin 223, as shown in Fig. 33. The link 225 has a bifurcated rear end which surrounds the handle shaft 143. On the shaft 143 is an arm 229 to which is pivoted one end of a link 230, the opposite end of which is provided with a slot 231, through which passes a screw 232 into the link 225. It will be evident that when the handle shaft 143 is rotated the first part of its movement will not be communicated to the link 225, owing to the slot in the link 230. As soon, however, as the end of the slot 231 comes in contact with the screw 232 the link 225 will be moved forward and the sector 221 will be moved in the direction of the arrow in Fig. 33.

The shaft 121 on which the total lever 120 is mounted is provided with an arm 235, best shown in Fig. 35, which arm is provided with a pin 236 adapted to engage with a pin 237 on the link 125, so as to move the link into the position shown in Fig. 35, so that the slot 127 will engage with the lower pin 224 of the sector 221. When the link 225 is moved into this position it is locked by means of a detent 238 pivoted at 239 to the side frame 53 and engaging with a half pin 240 on the lever 225. Secured to the upper end of the lever 238 is a spring 241 which tends to hold said lever against a pin 242, as shown in Fig. 35. It is evident that when the parts are in the position shown in Fig. 35, when the handle shaft 145 is rotated the sector 221 will be moved in the direction of the arrow in Fig. 35, that is in a direction opposite to that in the normal movement of the machine. As soon as the lever 225 has moved a short distance forward the detent 238 will become disengaged from the half pin 240, as owing to the pin 241 the detent cannot move with the lever 225. Inasmuch, however, as the pin 223 will come in contact with the upper curved edge of the lever 225, the tension of the spring 228 cannot return the lever 225 to its normal position until it has completed its stroke.

In order to remove from the adding mechanism numbers which have been erroneously placed in the machine, I provide the machine with an error key 245, the inner end of which bears upon a bell crank lever 246 carried by a shaft 247, (Figs. 1 and 33). The end of this bell crank lever 246 is provided with a pin 248 adapted to be engaged by a curved arm 249 rigidly carried by the handle shaft 143, so that when the key 245 is forced in and the handle shaft 143 rotated the bell crank lever will be held in its second position until the shaft 143 has completed its movement and returned to normal position. The shaft 247 which is in alinement with the shaft 99 hereinbefore described, has secured to it an arm 250, (Fig. 23) to the end of which is pivoted a link 251, the opposite end of which is pivoted to an arm 252 rigidly secured to a shaft 253 journaled in the side frames 55 and extending below the carrying bar frame 87. The link 251 is shaped so as to form a locking cam coöperating with a pin 254 on the total lever 120. This pin is so arranged that the link 251 cannot be moved while the lever 120 is out of its normal position and also so as to prevent the movement of the lever 120 when the link 251 is moved out of its normal position. The shaft 253 has secured to it a sector 255 (Fig. 22) having a projection 256 coöperating with a pin 257 on the carrying bar frame 87, so as to move said frame to disengage the carrying bars from the adding wheels when the error key is operated. The sector 255 is also provided with a slot 258 engaging with a pin 259 on a block 260 slidingly mounted on the adding wheel frame 83. This block 260 is provided with a projection 261, which normally lies between the frame 83 and the shaft 99, so that the frame will be moved on its pivot when the shaft 99 is rotated, so as to move the adding wheels out of mesh with the intermediate wheels 72. When, however, the sector 255 is moved by the error key, the projection 261 will be moved from between the shaft 99 and the frame 83, so that the frame will not be rocked on its pivot, but will remain in its normal position with the adding wheels in mesh with the intermediate wheels so that the number which has been transferred into the adding mechanism will be removed from the adding mechanism upon the operation of the handle. The sector 255 is also provided with a pin 262 adapted to move under the frame 83 to positively lock it in position.

In order to secure mutual locking means between the main handle and the total lever, I provide a sliding bar 263 having at one end a slot 264 embracing the handle shaft 143, and at the other a slot 265 through which the shaft 121 of the total lever passes. The bar 263 is provided with a projection 266 provided with a slot 267. In the slot 267 is a pin 268 carried by an arm 269 rigidly attached to the handle shaft 143.

The operation of the parts above described is briefly as follows: The order key 61 corresponding to the order of the left hand digit of the number to be written in the machine is first depressed. The depression of the order key 60 causes the corresponding key bar 61 to depress the cross bar 137, thus partially rotating the rock shaft 135. The movement of the rock shaft 135 is communicated through the arm 134 to the lever 132, the lower end of which comes in contact with the pin 133 on the sliding block 131, causing the tooth 130 of this block 131 to engage with the detent 128 on the total lever 120, so that the total lever cannot be operated until after the handle has been operated to return the sliding block 130 to normal position. The movement of the rock shaft 135 is also communicated through the lever 201 to the link 195, thus raising the arm 191 so that its pin 193 will disengage the pawls 182 and 183 from the rack 184, so as to release the carriage 64, which will be moved toward the left under the tension of the spring 180 until its upwardly extending blade 67 comes in contact with the depressed end 63 of the lever 61 which has been operated. The detent 68 engages with the end 63 of the lever 61 and prevents the carriage from rebounding. The forward projection 65 of the carriage 64 by its engagement with the groove of the hub 70 moves the sliding gear 71 along the shaft 72 until it is brought into engagement with the intermediate wheel 73 corresponding with the order key depressed. As soon as the order key is released the pawls 182 and 183 are returned into engagement with the rack 184. The numeral keys of the typewriter are now depressed and through mechanism which will be hereinafter described control the escapement mechanism hereinbefore described, so as to rotate the shaft 156 through a number of degrees proportional to the various numeral keys operated. The rotation of the shaft 156 is communicated through the gears 155, 153, 152 and 151 to the gear 150 on the end of the shaft 72, upon which is mounted the sliding gear 71 hereinbefore described. The gear 71 will thus be rotated so as to actuate the gear 73 with which it is in mesh. The movement of the gear 73 will actuate the corresponding registering wheels 78 and adding wheels 81. The depression of the numeral keys also rocks the shaft 181 by means hereinafter to be described, so as to move the pawl 182 to feed the carriage toward the right, step by step. When the number has been thus written into the machine it will be visible on the registering wheels 78, through the opening 80 in the front of the casing 51. If the handle 172 is now drawn forward the adding wheel frame 83 will be moved so as to disengage the adding wheels 81 from the intermediate wheels 73, this movement being due to the rotation of the shaft 99, which consequently acts upon the projection 261 of the sliding block 260, as shown in Fig. 22. The movement of the handle shaft 143 also moves the lever 255 so as to actuate the sector 221 in the direction indicated by the arrow in Fig. 33, so as to rotate the shaft 74 containing the comb 75, which will thus return the intermediate wheels 73 and registering wheels 78 to their normal position, leaving the number in the adding wheels 81. In case, however, the wrong number has been inadvertently inserted in the machine the error key 245 is forced inwardly so as to swing the bell crank lever 246, and, consequently, rotate the shaft 247. The rotation of the shaft 247 will be communicated through the arm 250, link 251 and arm 252 to the shaft 253, which will thus move the sector 255 so as to remove the projection 261 from the space between the shaft 99 and the frame 83, so that the frame will not be moved upon its pivot when the handle is drawn forward, and, consequently, when the intermediate and recording wheels are returned to zero the number which has been inserted in the adding wheels will be removed.

When it is desired to take the total the lever 120 is drawn forward. The first movement of the lever 120 causes the cam 127 to come in contact with the end of the comb 84, thus moving the comb longitudinally on its shaft, so as to bring its teeth into the path of the lugs 85 on the adding wheels 81. At the same time the movement of the shaft 121 causes the pin 236 on the arm 235 to come in contact with the pin 237 on the link 225, so as to cause the lower notch 227 of said link to engage with the pin 224 on the sector 221. The further movement of the total lever 120 moves the sector 123, which, during the previously described movements, has remained stationary owing to its slotted connection with the lever 120. When the sector 123 is moved, it rotates the gear 124 on the end of the shaft 82, thus rotating the said shaft and causing the teeth of the comb 84 to engage with the lugs 85 and thus rotate the adding wheels 81 to transfer the sum through the intermediate wheels 82 to the registering wheels 78. If the main handle 172 is now drawn forward the adding wheel frame 83 will be moved on its pivot to disengage the adding wheels from the intermediate wheels and the intermediate wheels will be returned to zero by means of the sector 221 acting on the wheel 220, the direction being reversed by the means hereinbefore described to correspond with the reversed direction in which the sum is transferred into the wheels. In case, however, it is desired to leave the total in the adding wheels the error key is forced in before pulling the handle, so that the adding wheels will remain in engagement with the intermediate wheels and consequently when the intermediate and registering wheels are returned to zero the sum will be retransferred into the adding wheels.

270 are the keys of the typewriting machine 52. Each of the keys 270, representing a number, is provided with a downwardly projecting hook 271, as best shown in Fig. 8. These hooks 271 are adapted to be engaged by notches 272 in pivoted and slidingly mounted members 273. These members 273 are each provided with a slot 274, through which passes a rod 275 which provides a pivot for the said member and also allows it to slide vertically when in the position shown in Fig. 3. The ends of the rod 275 slide in grooves 276 in the side frames 53 and 54, as best shown in Figs. 32 and 33. The ends of the rod 275 are surrounded by links 277, the opposite ends of which are pivoted to arms 278 rigidly secured to a rock shaft 279 pivoted in the side frames 53 and 54. This shaft 279 is provided with a segment 280 (Figs. 11 and 16) adapted to swing over the lever 191 hereinbefore described, so as to prevent the operation of the carriage when the adding mechanism is out of connection with the keys of the typewriter. The left hand arm 278 is also provided with an extension 281 having a pin 282 engaging with a slot 283 in a key bar 284, (see also Fig. 33) by means of which the adding mechanism is thrown into and out of engagement with the keys of the typewriter. The upper end of this key bar 284 is provided with a notch 285 adapted to engage with the edge of a guide 286, through which it passes, to hold it in its lower position, so as to maintain the connection between the adding machine and the keys of the typewriter. The upper end of the key bar is also provided with a key 287 by means of which it is operated. The lower end of each of the members 273 is pivoted to a bar or lever 289 extending to the rear of the machine and pivoted on a shaft 290 (Fig. 31) supported upon the frames 56 hereinbefore described. The rear end of the bar or lever 289 is connected to a second bar or lever 291 which corresponds to the numeral key bars in the Hopkins patent above referred to. Inasmuch as it is necessary to have the bars or levers 291 accurately operated through a predetermined distance and as the movement of the key bars of the typewriter varies in different machines and in different bars of the same machine, it is necessary to provide an adjustable connection between the bars 289 and the bars 291. This connection I obtain by means of devices shown in Fig. 31 and in detail in Figs. 25 and 26. Pivoted to the rear end of the bar 289 by means of a rivet or bolt 292 is an anchor block 293 having an over-turned portion through which passes a bolt 294. This bolt is threaded at its lower end and is preferably knurled at its central portion, as shown in the drawings, so as to allow it to be readily rotated by hand. The lower threaded end of the bolt 294 enters a second anchor block 295 pivoted by means of a rivet or bolt 296 to the end of the lever 291. The threaded portion of the bolt 294 is also provided with a lock nut 297. It will be evident that by this construction the distance between the ends of the bars 289 and 291 can be readily regulated to compensate for the difference in movement between the key bars of the typewriting machine and that after the proper adjustment has been obtained the parts can be firmly locked in position by means of the lock nuts 297.

The forward ends of the bars 291 are provided with stops 298 (Figs. 3, 16, 17 and 23) adapted to be thrown into the path of a projection 299 on the sliding member 300, which controls the amount of escapement of the motor 174 hereinbefore described. This sliding member 300 is mounted upon a pivoted frame 301 carried by a shaft 304 pivoted in short standards 302 and said member 300 is provided with a rack 303 engaging with the gear wheel 158 rigidly secured to the shaft 156 hereinbefore described. The amount of movement of the shaft 156, and, consequently, of the adding wheels in the different orders are thus determined by the lengths of the bars 291 operated from the numeral keys of the typewriting machine. The frame 301 is swung on its pivot by the downward movement of the bars 291, said bars coming in contact with a cross-rod 305, as best shown in Fig. 17.

Secured to the end of the shaft 304 is a pawl 306, (Figs. 5 and 6) which engages with the escape wheel 163 hereinbefore described, so that the movement of the frame 301 on its pivot controls the motor escapement. In order to prevent the movement of the frame 301 when one of the order keys is depressed, I pivot to the plate 132 (Fig. 23) one end of a link 359, the opposite end of which is pivoted to a section 360 adapted to be moved under a pin 361 on the said frame 301 and thus prevent its movement.

In order to lock the bars 291 when the handle is in its forward position, I place below said bars a comb 307 shown in Fig. 31 and in detail in Fig. 4. The bars 291 work between the teeth of this comb and said comb is provided with an auxiliary comb 308 slidingly secured to the main comb by means of screws 309 passing through slots 310 in the auxiliary comb and into the main comb as shown in Fig. 7. The auxiliary comb 308 is normally held in the position shown in Fig. 4, so that the key bars 291 may be operated. This is accomplished by means of a coil spring 311 secured at one end to a pin 312 in the said auxiliary comb 308 and at the other to a pin 313 passing through a slot 314 in the auxiliary comb and into the main comb.

In order to move the auxiliary comb 308 laterally and lock the bars 291, I provide a locking bar 315 passing through an opening 316 in the auxiliary comb 308 and an opening 317 in the main comb 307, as best shown in Fig. 7. This locking bar 315 is provided with an incline 318 adapted to strike against the edge of the opening 316 and thus move the auxiliary comb laterally. The locking bar 315 is pivoted at 319 to the sector 142, as best shown in Fig. 23, so that the auxiliary comb 308 will be operated to lock the bars 291 each time the shaft 143 is operated by the forward movement of the handle. In order to insure the complete movement of the bar 291 before it returns to its normal position, I provide the full stroke lock shown in Fig. 31. Pivoted to the bar 291 slightly forward of the shaft 320, upon which it is pivoted, is a link 321. The lower end of this link 321 is pivoted to a lever 322 mounted on a shaft 323 carried in short standards 324. The rear end of the lever 322 is provided with a pivoted detent 325 adapted to engage with teeth 326 in a plate 327 carried by the uprights 324. The arrangement of these parts is such that after the bar 291 has begun its movement and the detent 325 is brought into engagement with the teeth 326, the bar can not return until it has completed its stroke so as to reverse the detent 325. The movement of the bars 291 also operate the carriage feeding mechanism hereinbefore described. In order to accomplish this I pivot on the shaft 320 two plates 330, (Figs. 27 and 31) provided with a rod 331 passing over the tops of said bars 291, so that the said plates 330 will be rocked on their pivot when one of the bars is operated. The said plates 330 are also provided with downward extensions 332 carrying a cross bar 333 adapted to engage with a short bar 334 carried by plates 335. These plates 335 are secured to a rock shaft 185 on its pivot hereinbefore described, as best shown in Fig. 27.

The rock shaft 281 after being actuated by the movement of the keys 291, is locked against return movement by means of a detent 336 shown in Fig. 13, said detent 336 having a hook 337 which takes over a half pin 338 on an arm 339 rigidly carried on said rock shaft 185. The arm 339, and, consequently, the rock shaft 185 is held in normal position by means of a coil spring 340 secured at one end to said arm and at the other to a pin 341 carried on the base of the machine. The upper end of the detent 336 lies in the path of the swinging frame 301, so that when the said frame returns to its normal position the hook 337 will be disengaged from the pin 338, so that the rock shaft 185 may be returned to its normal position by means of the spring 340. The upper end of the arm 339 is also connected by means of a link 342 and rod 343 with a bell-crank lever 344 having a pin 345 engaging with a pin 346 in a hook 347 shown in detail in Fig. 37. This hook 347 is adapted to engage and reverse the locking roll 348 carried by the arm 172 on the shaft 143 of the handle 349, said arm serving as a full stroke lock for the handle, as is fully described in the patent to Hopkins above referred to and which need not, therefore, be described in detail.

The rear ends of the levers 289 are guided by a comb 350 carried by uprights 351, (Figs. 31 and 36). These uprights 351 also carry a plate 352 having an opening 353 for the bars 291. Pivoted to this plate 352 are locking pieces 354 shown in detail in Fig. 36. These locking pieces 354 have enlarged upper ends 355 and adjacent to the terminal ones the plate 352 is provided with stops 356, against which said pieces are adapted to be forced when one of the bars 291 is operated. The distance between the enlarged upper ends 355 of the terminal locking pieces 354 and the stops 356 is such that when one of the bars 291 passes between a pair of pieces 354, the end pieces will be forced against the stops, and, consequently, another bar cannot be operated until the first bar has returned to its normal position. The bars 291 are held in their normal position by means of coil springs 357 secured at one end to the said bars and at the other to a plate 358 secured to the bottom of the machine.

In order to prevent the order keys from being operated after the operation of a numeral key and before the handle is actuated, I provide the lever 191 with a pin 362, (Figs. 10 and 16) which has a slot to receive a hook 363. The hook 363 is normally in position to allow the movement of the lever 191 but is moved to engage the pin 162 and thus lock the lever by a block 364 on the shaft 104 when the frame 301 is swung on its pivot. The hook 363 is returned to its normal position by a pin 365 when the handle is operated to rock the shaft 143.

The control of the adding machine carriage from the order keys 60 has been hereinbefore described. I will now describe the method of controlling the typewriter carriage from the same keys. Secured to each of the key bars 61 is a link 370, (Figs. 16, 29 and 31). These bars 370 extend toward the rear of the machine and are each secured to a short arm 371 extending downwardly from a rock shaft 372 pivoted in the frames 56. Each of the shafts 372 is also provided with an upwardly extending arm 373 to which is attached a link 374, for controlling the movement of the typewriter carriage. As will be evident from an inspection of Fig. 29, this arrangement is such that the control of the typewriter carriage is the reverse of that of the adding machine carriage, the right hand link 370 controlling the left hand link 374 and the left hand link 370 controlling the right hand link 374 with all the intermediate links correspondingly changed, the reasons for this being that while the adding machine carriage moves from left to right, the typewriting carriage moves from right to left. The end of each of the links 374 is pivoted at 375 to a lever 376. This lever 376 is pivoted at 377 to lugs 378 on a frame 379 (Fig. 39) secured to the uprights of the typewriter by means of set screws 380, (see also Figs. 38 and 40.) The frame 379 also carries uprights 381 in which are slidingly mounted stops 382, each of which is provided with a pin 383 engaged by the bifurcated upper end of one of the levers 376. The forward end of each of the stops 382 is adapted to be thrown into the path of a rearwardly projecting plate 384 adjustably carried on a notched bar 385. By loosening the thumb nut 386 these plates 384 may be moved along the bar 385 so as to vary the position or the number of columns controlled by the tabulating mechanism, (see Fig. 41.) Each of the stops 382 is provided with a beveled downward projection 390 which engages with a pivoted detent 391 journaled in the uprights 381. This detent 391 is adapted to engage with the downward projection 390 when the stop is moved forward and thus lock the stop in its forward position until the typewriter carriage has reached the desired position, and, consequently, the plate 384 has come in contact with the stop 382. In order to release the stop 382 from the detent 391 the said detent is provided with an upwardly projecting blade 392 and each of the stops 384 has pivoted to its lower end a releasing plate 393 shown in detail in Figs. 19, 20 and 21. The plate 393 is provided with a finger 394 adapted to come in contact with the stop 382 slightly before the plate 384, so as to swing the said plate on its pivot and said plate is provided with a pin 395 which is moved into contact with the blade 392 so as to swing the detent 391 on its pivot and release the stop 382 just as the plate 384 comes in contact therewith. The bar 385 is carried by brackets 398 secured by means of set screws 399 to the carriage of the typewriting machine.

In order to release the feed mechanism of the typewriter carriage when one of the stops 382 is operated, to position the typewriter carriage, I provide each of said stops 382 with a downward projection 400 best shown in Fig. 39. This downward projection 400 is adapted to engage with a bell-crank lever 401 pivoted on a shaft 402 carried by the uprights 381. The forwardly projecting end of the bell-crank lever 401 is connected by means of a short link 403 with a lever 404 which extends to the rack bar 405 of the feed mechanism of the typewriter carriage, so as to lift said rack bar 405 out of engagement with the feed wheel 406 so as to release the carriage when one of the stops 382 is thrown into its forward position.

In order to return the typewriter carriage when the adding machine handle is operated, the gear wheel 177, which is operated by the handle, as has been hereinbefore described, meshes with a gear wheel 410, as shown in Figs. 2 and 6. This gear wheel 410 is supported in standards 411 and has secured to it a drum 412, around which passes a cord or wire 413 for returning the typewriter carriage, as will be hereinafter described. The cord or wire 413 passes rearwardly from the drum 412 and thence around pulleys 414, as shown in Fig. 2. These pulleys 414 are mounted on a shaft 415, which passes through slots 416 in standards 417, so that the said pulleys may be raised or lowered to tighten the cord or wire 413. From the pulleys 414 the cord 413 passes up as shown in Fig. 40 and then passes around pulleys 418 carried on the frame 379 hereinbefore described (see also Fig. 42). After passing over the pulleys 418 the cord 413 passes around horizontal pulleys 419 also carried by the frame 379 (see also Fig. 38). One strand of the cord 413 between the pulleys 419 is secured by means of a clamp 420 (Fig. 39) to a carriage 421, by means of which the typewriter carriage is returned to normal position. This carriage 421 is provided with wheels 422, which run upon rods 423 carried by the frame 379 hereinbefore described, as best shown in Fig. 38. The upper part of the carriage 421 forms a toothed gage bar 424, as best shown in Fig. 42. Sliding on the gage bar 424 is a block 425, which can be adjusted by means of a clamp lever 426. When the handle is operated the movement of the handle is communicated through the gears 177 and 410 to the drum 412 and thence through the cord 413 to the carriage 421, so as to move the carriage toward the right hand end of the machine. In the path of the block 425 is a pin 430 slidingly carried in an L-shaped arm 431, forming part of one of the brackets 398 hereinbefore described, which carry the bar 385 and are secured to the carriage of the typewriter. Consequently, as soon as the block 425 comes in contact with the pin 430 it will move the typewriter carriage toward the right hand end of the machine until the carriage is stopped by the usual means. The pin 430 is held in its normal position by means of a coil spring 432, as shown in Fig. 18, so that there is no relative movement between the pin and the L-shaped arm 431 until the typewriter carriage comes against its stop. The further movement of the block 425, after the typewriter carriage has come up against its stop, compresses the spring 432 and causes the pin 430 to slide in the arm 431. The opposite end of the pin 430 is pivoted to a lever 433 (Fig. 18) rigidly secured to a rock shaft 434 pivoted in brackets 435 carried by the arm 431. To the upper end of the rock shaft 434 is rigidly secured a second arm 436. Pivoted to this arm 436 is a link 437, the forward end of which is pivoted at 438 (Fig. 43) to a feed pawl 439 adapted to engage with the ratchet wheel 440 of the platen of the typewriter. When the rock shaft 434 is actuated, its movement will be communicated through the link 437 to the feed pawl 439, which will first be moved upon its pivot so as to swing its lower end 441 upwardly and into contact with the teeth of the ratchet wheel 440. After the end 441 of the pawl has moved into engagement with the teeth of the ratchet wheel 440, the further movement of the pawl is a combined one consisting of the movement of the pawl on its pivot 442 and the movement of the plate 443 upon which the said pawl is pivoted upon its own pivot 444. These movements are controlled by means of a cam plate 445 carried on the link 437 and provided with a cam slot 446 through which passes a pin 447 carried on the plate 443. The plate 443 carrying the feed pawl 439 is held in its normal position by means of the spring 448 secured at one end to a pin 449 in said plate and at the other to a pin 450 in one of the brackets 398. A pin 451 also acts as a stop to limit the movement of the said plate 443.

The operation of the machine by the order keys is as follows: When one of the order keys 60 is depressed the corresponding link 370 will be actuated to position the typewriter carriage, as will be hereinafter described. If the adding machine is thrown into connection with the typewriting machine by the depression of the key 287 the carriage of the adding mechanism will also be positioned, as has been hereinbefore described. In case, however, the adding mechanism is out of engagement with the typewriting mechanism the sector 280 will be moved into position over the lever 191, so that the adding machine carriage will not be affected. In either case the movement of the link 370 will actuate the corresponding rock shaft 372 (Fig. 3) so that the link 374 on said rock shaft will be moved toward the rear of the machine. The movement of the link 374 actuates the corresponding lever 376 so as to throw one of the stops 382 (Fig. 39) forward into position to engage one of the plates 384. When the stop 382 has been moved forward its downward projection 390 is engaged by the detent 391 so as to lock the said stop in its forward position. The forward movement of the stop also actuates the bell-crank lever 401, the movement of which is communicated through the link 403 and lever 404 to the rack bar 405, which is thus moved out of engagement with the feed wheel 406 so as to release the typewriter carriage. The typewriter carriage now moves toward the left hand end of the machine until one of the plates 384 comes in contact with the forwardly projecting stop 382, thus stopping the carriage of the typewriter in the desired position. Just before the plate 384 comes in contact with the stop, the finger 394 of the plate 393 engages with the said stop, as shown in Fig. 20, so as to cause the pin 395 to act on the blade 392 and thus move the detent 391 to release the stop, which now resumes its normal position, so that the rack bar 405 again engages with the feed wheel 406 and the typewriter carriage is free to move farther toward the left of the machine by the ordinary operation of the keys. It will be evident, therefore, that the typewriter carriage can be positioned by means of the order keys either in conjunction with the adding machine carriage or separate therefrom, as desired. When the handle of the adding machine is operated the carriage 421 is moved toward the right hand end of the machine, as has been hereinbefore described, so that the adjustable block 421 on said carriage comes in contact with the pin 430 and returns the carriage to the right hand end of the machine, at the same time actuating the platen to feed it forward for the next line in the manner hereinbefore described.

Having fully described my invention, what I claim as new and desire to secure by Letters Patent of the United States, is—

1. The combination with an adding machine provided with a translating device, of a typewriting machine provided with a carriage, order keys provided with means for controlling said translating device, said order keys also being provided with separate means for controlling said type writer carriage, and means for rendering said keys inoperative on said translating device.

2. The combination with an adding machine provided with a translating device, of a typewriting machine provided with a carriage, order keys provided with means for controlling said translating device, said order keys being also provided with separate means for controlling the typewriter carriage, means for simultaneously actuating said adding machine and typewriting machine, and means for rendering the said keys inoperative upon said translating device, said latter means also throwing said adding machine out of operation.

3. The combination with an adding machine provided with a translating device, of a typewriting machine provided with a carriage, order keys, a set of stops actuated by said order keys for controlling said translating device, a second set of stops actuated by said order keys for controlling said typewriter carriage, and means for rendering said keys inoperative upon said translating device.

4. The combination with an adding machine provided with a translating device, of a typewriting machine provided with a carriage, order keys, a set of stops actuated by said order keys for controlling said translating device, a second set of stops actuated by said order keys for controlling said typewriter carriage, means for simultaneously actuating said type-writing machine and adding machine, and means for rendering said keys inoperative upon said translating device, said latter means also throwing said adding machine out of operation.

5. The combination with an adding machine provided with a translating device, of a typewriting machine provided with a carriage, order keys, a set of stops actuated by said order keys for controlling said translating device, a second set of stops actuated by said order keys for controlling said typewriter carriage, said second set of stops coöperating with a plurality of abutments on said carriage, and means for rendering said keys inoperative upon said translating device.

6. The combination with an adding machine provided with a translating device, of a typewriting machine provided with a carriage, order keys, a set of stops actuated by said order keys for controlling said translating device, a second set of stops actuated by said order keys for controlling said typewriter carriage, said second set of stops coöperating with a plurality of abutments on said carriage, means for simultaneously actuating said adding machine and typewriting machine, and means for rendering said keys inoperative upon said translating device, said latter means also throwing said adding machine out of operation.

7. The combination with an adding machine provided with a translating device, of a typewriting machine provided with a carriage, order keys, a set of stops actuated by said order keys for controlling said translating device, a second set of stops actuated by said order keys for controlling said typewriter carriage, said second set of stops coöperating with a plurality of abutments on said carriage, means for rendering said keys inoperative upon said translating device, and means for returning said typewriter carriage to normal position.

8. The combination with an adding machine provided with a translating device, of a typewriting machine provided with a carriage, order keys for controlling said translating device, said order keys also controlling said typewriter carriage, numeral keys for simultaneously actuating said adding machine and typewriting machine, and means for rendering said order keys inoperative upon said translating device, said means also disengaging said adding machine from said numeral keys.

9. The combination with an adding machine provided with a translating device, of a typewriting machine provided with a carriage, order keys for controlling said translating device, said order keys also controlling said typewriter carriage, numeral keys for simultaneously actuating said adding machine and typewriting machine, means for rendering said order keys inoperative upon said translating device, said means also disengaging said adding machine from said numeral keys, and means for returning said carriage to normal position.

10. The combination with an adding machine provided with a translating device, of a typewriting machine provided with a carriage, order keys for controlling said translating device, said order keys also controlling said typewriter carriage, numeral keys for simultaneously actuating said adding machine and typewriting machine, means for rendering said order keys inoperative upon said translating device, said means also disengaging said adding machine from said numeral keys, and means for returning said translating device and carriage to normal position.

11. The combination with an adding machine provided with a translating device and an operating handle, of a typewriting machine provided with a carriage, order keys for controlling said translating device, said order keys also controlling said typewriter carriage, means for simultaneously actuating said adding machine and typewriting machine, means for rendering said keys inoperative upon said translating device, and means operated by said handle for returning said carriage to normal position.

12. The combination with an adding machine provided with a translating device and an operating handle, of a typewriting machine provided with a carriage, order keys for controlling said translating device, said order keys also controlling said typewriter carriage, means for simultaneously actuating said adding machine and typewriting machine, means for rendering said keys inoperative upon said translating device, said latter means also throwing said adding machine out of operation, and means operated by said handle for returning said carriage to normal position.

13. The combination with an adding machine provided with a translating device and an operating handle, of a typewriting machine provided with a carriage, order keys for controlling said translating device, said order keys also controlling said typewriter carriage, numeral keys for simultaneously actuating said adding machine and typewriting machine, means for rendering said order keys inoperative upon said translating device, and means operated by said handle for returning said carriage to normal position.

14. The combination with an adding machine provided with a translating device, and an operating handle, of a typewriting machine provided with a carriage, order keys for controlling said translating device, said order keys also controlling said typewriter carriage, numeral keys for simultaneously actuating said adding machine and typewriting machine, means for rendering said order keys inoperative upon said translating device, said means also disengaging said adding machine from said numeral keys, and means operated by said handle for returning said carriage to normal position.

15. The combination with an adding machine provided with a translating device and an operating handle, of a typewriting machine provided with a carriage, order keys for controlling said translating device, said order keys also controlling said typewriter carriage, numeral keys for simultaneously actuating said adding machine and typewriting machine, means for rendering said order keys inoperative upon said translating device, said means also disengaging said adding machine from said numeral keys, and means operated by said handle for returning said translating device and carriage to normal position.

16. The combination with an adding machine provided with a carriage, of a typewriting machine also provided with a carriage, order keys provided with means for positioning said adding machine carriage, said order keys being also provided with separate means for positioning said typewriting machine carriage, and means for rendering said keys inoperative upon said adding machine carriage.

17. The combination with an adding machine provided with a translating device and order keys, of a typewriting machine provided with a carriage, numeral keys and means for throwing the numeral keys of said typewriting machine into and out of engagement with said adding machine, said means also determining the control of said translating device by said order keys, and said order keys positioning said typewriter carriage.

18. The combination with an adding machine provided with a carriage, of a typewriting machine also provided with a carriage, means for simultaneously moving said carriages in the same direction to position the same, and other means for moving said carriages in opposite directions.

19. The combination with an adding machine provided with a carriage, of a typewriting machine also provided with a carriage, means for simultaneously moving said carriages in the same direction to position the same, and numeral keys for moving said carriages in opposite directions.

20. The combination with an adding machine provided with a carriage, of a typewriting machine also provided with a carriage, order keys for simultaneously moving said carriages in the same direction to position the same, and numeral keys for moving said carriages in opposite directions.

21. The combination with an adding machine provided with a carriage, of a typewriting machine also provided with a carriage, means for simultaneously moving said carriages in the same direction to position the same, and means for returning said carriages to normal position.

22. The combination with an adding machine provided with a carriage, of a typewriting machine also provided with a carriage, means for simultaneously moving said carriages in the same direction to position the same, other means for moving said carriages in opposite directions, and means for returning said carriages to normal position.

23. The combination with an adding machine provided with a carriage, of a typewriting machine also provided with a carriage, means for simultaneously moving said carriages in the same direction to position the same, numeral keys for moving said carriages in opposite directions, and means for returning said carriages to normal position.

24. The combination with an adding machine provided with a carriage, of a typewriting machine also provided with a carriage, order keys for simultaneously moving said carriages in the same direction to position the same, numeral keys for moving said carriages in opposite directions, and means for returning said carriages to normal position.

25. The combination with an adding machine provided with a carriage and an operating handle, of a typewriting machine also provided with a carriage, means for simultaneously moving said carriages in the same direction to position the same, and means operated by said handle for returning said carriages to normal position.

26. The combination with an adding machine provided with a carriage and an operating handle, of a typewriting machine also provided with a carriage, means for simultaneously moving said carriages in the same direction to position the same, other means for moving said carriages in opposite directions, and means operated by said handle for returning said carriages to normal position.

27. The combination with an adding machine provided with a carriage and an operating handle, of a typewriting machine also provided with a carriage, means for simultaneously moving said carriages in the same direction to position the same, numeral keys for moving said carriages in opposite directions, and means operated by said handle for returning said carriages to normal position.

28. The combination with an adding machine provided with a carriage and an operating handle, of a typewriting machine also provided with a carriage, order keys for simultaneously controlling the movement of said carriages in the same direction to position the same, numeral keys for moving said carriages in opposite directions, and means operated by said handle for returning said carriages to normal position.

29. The combination with an adding machine provided with an operating handle, of a type-writing machine provided with a platen movable for line and letter spacing and connections operated by the pull of said handle for returning said platen to initial letter spacing position, and means actuated by the return of said platen for feeding the same for line spacing.

30. The combination with an adding machine provided with an operating handle, of a type-writing machine provided with a platen movable for line and letter spacing, an abutment on said platen, connections from said abutment for moving said platen for line spacing, and a second and adjustable abutment adapted to coöperate with said first abutment and actuated by the pull of the handle.

31. The combination with an adding machine provided with an operating handle, of a type-writing machine provided with a rotary and longitudinally movable platen, an abutment on said platen, connections from said abutment for rotating said platen, and a second and adjustable abutment adapted to coöperate with said first abutment and actuated by the pull of said handle.

32. The combination with an adding machine provided with an operating handle, of a type-writing machine provided with a platen movable for line and letter spacing, a yielding abutment on said platen, connections from said abutment for moving said platen for line spacing, and a second and adjustable abutment adapted to coöperate with said first abutment to move said platen for both line and letter spacing, said second abutment actuated by the pull of said handle.

In testimony whereof, I have hereunto set my hand and affixed my seal in the presence of the two subscribing witnesses.

G. N. HINCHMAN. [L. S.]

Witnesses:
 W. A. ALEXANDER,
 BENNETTE PIKE.